US009026618B2

(12) United States Patent
Hung

(10) Patent No.: US 9,026,618 B2
(45) Date of Patent: May 5, 2015

(54) SYSTEM AND METHOD FOR EXPANDING PC-BASED SOFTWARE CAPABILITIES

(75) Inventor: Jason J. Hung, Paradise Valley, AZ (US)

(73) Assignee: Junglewave Interactive, LLC, Paradise Valley, AZ (US)

( * ) Notice: Subject to any disclaimer, the term of this patent is extended or adjusted under 35 U.S.C. 154(b) by 396 days.

(21) Appl. No.: 12/941,831

(22) Filed: Nov. 8, 2010

(65) Prior Publication Data

US 2012/0117125 A1 May 10, 2012

(51) Int. Cl.
*G06F 17/30* (2006.01)
(52) U.S. Cl.
CPC ............................... *G06F 17/30581* (2013.01)
(58) Field of Classification Search
None
See application file for complete search history.

(56) References Cited

U.S. PATENT DOCUMENTS

| | | | | |
|---|---|---|---|---|
| 8,204,521 | B2* | 6/2012 | Hardy et al. .................. | 455/466 |
| 2008/0140665 | A1* | 6/2008 | Ariel et al. .......................... | 707/9 |
| 2009/0196123 | A1* | 8/2009 | Gautam ............................ | 368/52 |
| 2009/0248695 | A1* | 10/2009 | Ozzie et al. ...................... | 707/10 |
| 2009/0249224 | A1* | 10/2009 | Davis et al. .................... | 715/753 |
| 2010/0106744 | A1* | 4/2010 | Wang ............................. | 707/783 |
| 2010/0257451 | A1* | 10/2010 | Halevi et al. .................. | 715/733 |
| 2011/0173294 | A1* | 7/2011 | Jackson ......................... | 709/217 |
| 2011/0179162 | A1* | 7/2011 | Mayo et al. .................... | 709/224 |
| 2011/0320575 | A1* | 12/2011 | Pope et al. ..................... | 709/220 |

OTHER PUBLICATIONS

Google Apps: "Google Calendar", http://www.google.com/a/help/intl/en/users/calendar.html, as retrieved Jan. 10, 2008.*
David Marmaros, Official Gmail Blog: Smart Rescheduler in Google Calendar Labs, Mar. 18, 2010, pp. 1-3, http://gmailblog.blogspot.com/2010/03/smart-rescheduler-in-google-calendar.html.*
Alice Brown, Official Gmail Blog: Google Calendar Sync now supports Outlook 2010, Aug. 17, 2010, pp. 1-2, http://gmailblog.blogspot.com/2010/08/google-calendar-sync-now-supports.html.*

* cited by examiner

*Primary Examiner* — Nicholas Taylor
*Assistant Examiner* — Clayton R Williams
(74) *Attorney, Agent, or Firm* — Novak Druce Connolly Bove + Quigg LLP

(57) ABSTRACT

System and method for expanding the capabilities of a PC-based software are disclosed. The system provides a technique for synchronizing a database associated with a PC-based software with a WAN server database. Additionally, a WAN server, associated with the WAN server database, is configured to provide substantially the same functionality as that of the PC-based software. This effectively facilitates web-access of the PC-based software and database by way of the WAN server and database. The WAN server may be configured to provide additional functions in order to expand the functionality of the PC-based software. The WAN server may also be configured to integrate distinct databases by either relaying information between the distinct databases or integrating the information from the distinct databases into a single database.

42 Claims, 24 Drawing Sheets

SYSTEM AND METHOD FOR EXPANDING PC-BASED SOFTWARE CAPABILITIES

FIELD

The present disclosure relates generally to software, and in particular, to a system and method for expanding the capabilities of personal computer (PC)-based software.

BACKGROUND

Many software specifically designed for operating on a personal computer (PC) (i.e., PC-based software), such as Quickbooks®, have provided many useful and essential functions for clients. Because of their usefulness, these PC-based software are ubiquitous in many business and personal settings. As such, many clients are so heavily dependent on such PC-based software that switching to a wide area network (WAN) software, such as a web- or internet-based software, becomes very difficult due to effort, time and cost to implement the transition.

Although PC-based software have served clients very well, they typically have many drawbacks. For instance, PC-based software typically come with a finite or limited set of functions defined by the software manufacturer. Although some software manufacturers do provide upgrades, add-on modules, and updates to augment their limited set of functions, clients are still tied to the available functions provided by the manufacturers. Some software manufacturers allow client-originated functions, such as macros, to operate with their software. However, usually these client-originated functions are limited and may not achieve the desired functionality for the client.

Another drawback of PC-based software is that accessing the software or its database from a remote computer via a WAN, such as the Internet, may be difficult and typically not user-friendly. For instance, a user using such a remote computer may have to set up a virtual private network (VPN) in order to gain access to the PC-based database, while running a copy of the PC-based software on the remote computer. In such a case, another copy of the software has to be purchased for the remote computer, which could be expensive, especially for the case where there are a lot of remote users needing to access the PC-based database.

Additionally, often it may be desirable to integrate or combine a PC-based software database with another PC-based software or a WAN-based software. For instance, it may be desirable to integrate an accounting software database, such as a Quickbooks® database, with an inventory or point-of-sale database. However, for the same reason it is difficult to transition from a PC-based software to a WAN-based software and database, it is generally difficult to perform such integration of distinct databases.

Accordingly, there is a need in the relevant art for a system and method that addresses these and other concerns.

SUMMARY

An aspect of the disclosure relates to a system and method for mirroring or synchronizing a PC-based software database with a WAN server database. In particular, the system comprises a middleware module adapted to detect a change to the PC-based software database caused by a user operating a PC-based client device, and transmit a message indicating the change to a WAN server by way of a WAN. The WAN server, in turn, modifies or updates the WAN server database based on the indicated change. In this manner, the WAN server database and the PC-based database may be synchronized.

Another aspect of the disclosure relates to a system and method for mirroring or synchronizing a WAN server database with a PC-based software database. In particular, the system comprises a WAN server adapted to receive a request to change a WAN server database by way of a WAN, modify or update the WAN server database based on the requested change, and transmit a message indicating the change to a middleware module by way of the WAN. The middleware module then updates a PC-based software database based on the change. Similarly, in this manner, the WAN server database and the PC-based database may be synchronized.

Another aspect of the disclosure capitalizes on the synchronization of the PC-based software database and the WAN server database. In this regards, a WAN server associated with the WAN server database may be configured to implement substantially the same functions as the software associated with the PC-based software database. Thus, a user operating a web client device may access the functions provided by the WAN server and operate on the WAN server database as if the user was running the software on a PC-based client device and operating on the PC-based software database. Thus, the system effectively provides for web access of the functions and database of a PC-based software. The WAN server may be further adapted to assign a collision-prevention code to a database object to prevent inconsistent modifications to the object by multiple users.

Another aspect of the disclosure relates to configuring the WAN server not only with substantially the same functions as that of a PC-based software, but providing additional functionality in order to effectively expand the capabilities of the PC-based software. For example, functions related to improved security access, data object traceability, revisions, approvals, messages (e.g., alerts), and data analysis may be effectively added to a PC-based software that lacks those functions. It shall be understood that these are some examples of functions that may be added to the limited set of functions typically associated with a PC-based software. Of course, a multitude of other distinct functions may be added.

Another aspect of the disclosure relates to integrating distinct databases. For instance, using the technology discussed above, a WAN server may be configured to integrate distinct databases, such as a pair of distinct PC-based software databases, a PC-based software database with a WAN-based database, or a pair of distinct WAN-based databases.

In one exemplary implementation, a WAN server receives information related to a modification made to a first distinct database by way of a WAN, optionally translates the modification information into a format associated with a second distinct database, and transmits the re-formatted information to the second distinct database. Thus, the WAN server operates as a relay device in order to relay modification information back and forth between two distinct databases in order to synchronize the databases.

In another exemplary implementation, a WAN server receives information related to a modification to a first distinct database by way of a WAN, receives information related to a modification to a second distinct database by way of the WAN, and updates or modifies a WAN server database based on the modifications to the first and second distinct databases. Optionally, the WAN server may translate one or both of the modifications into a format associated with the WAN server database. Thus, the WAN server operates to integrate information from distinct databases into a single database.

Other aspects, advantages and novel features of the present invention will become apparent from the following detailed description of the invention when considered in conjunction with the accompanying drawings.

DETAILED DESCRIPTION OF THE EXEMPLARY EMBODIMENTS

Figure 1A:
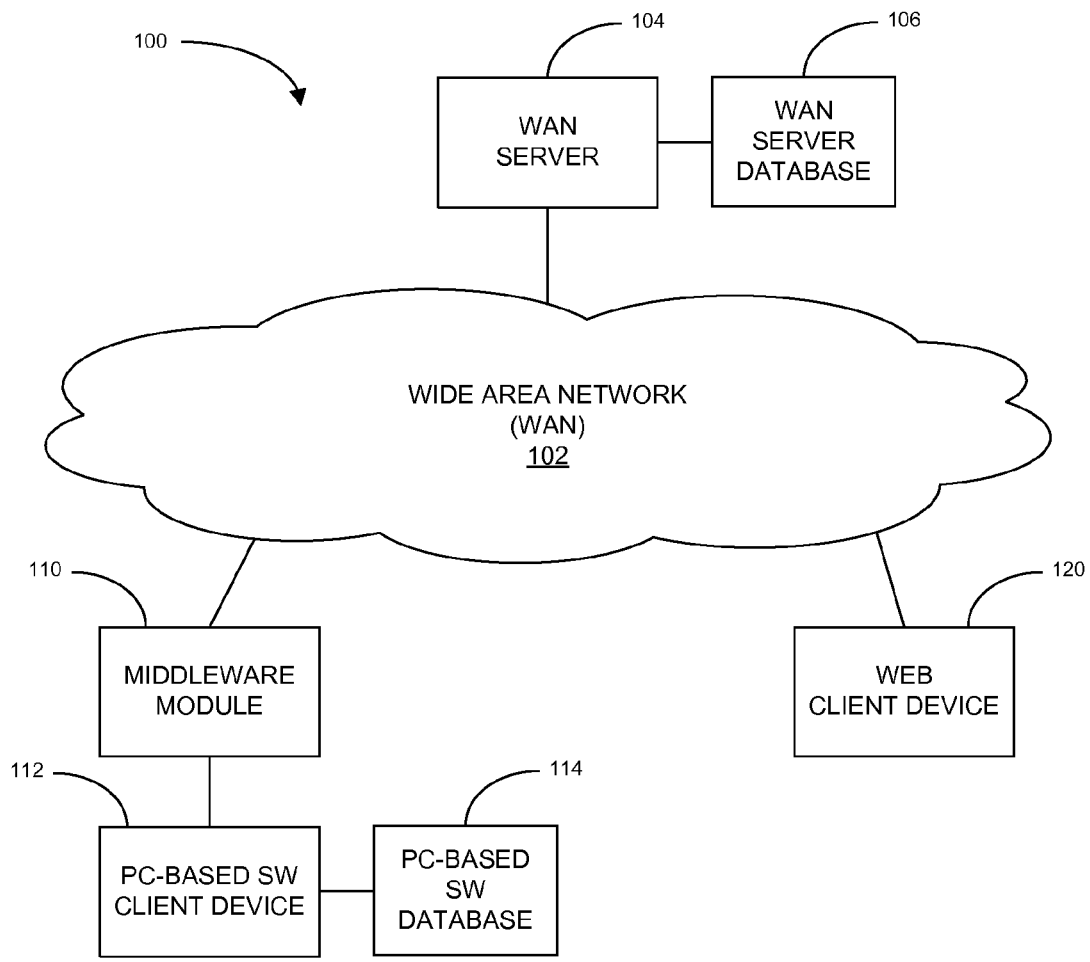
FIG. 1A illustrates a block diagram of an exemplary system for expanding the capabilities of a PC-based software in accordance with an aspect of the disclosure.

FIG. 1A illustrates a block diagram of an exemplary system 100 for expanding the capabilities of a PC-based software in accordance with an aspect of the disclosure. As discussed in more detail herein, the system 100 facilitates the expansion of functions of a PC-based software, provides for web- or internet access of data associated with the PC-based database, and further provides for redundancy of the PC-based database.

In particular, the system 100 comprises a wide area network (WAN) 102, such as the Internet, a WAN server 104 coupled to the WAN 102, and a WAN server database 106 coupled to the WAN server 104. The system 100 further comprises a middleware module 110 coupled to the WAN 102, a PC-based software (SW) client device 112 coupled to the middleware module 110, and a PC-based SW database 114 coupled to the PC-based SW client device 112. The system 100 may also include one or more web client devices, for example, such as web client device 120, coupled to the WAN 102 for interacting with the WAN server 104 as well as accessing the WAN server database 106 using the WAN server 104.

As discussed in more detail below, the middleware module 110 and WAN server 104, in conjunction, operate to synchronize or mirror the PC-based SW database 114 with the WAN server database 106. This may be accomplished by the middleware module 110 monitoring for changes in the PC-based SW database 114, providing the detected changes to the WAN server 104 via the WAN 102, and the WAN server 104 updating the WAN server database 106 based on the changes. Similarly, this may also be accomplished by the WAN server 104 monitoring for changes in the WAN server database 106, providing the detected changes to the middleware module 110 via the WAN 102, and the middleware module 110 updating the PC-based SW database 114 based on the changes.

The WAN server 104 may be configured to implement substantially the same functions provided by the PC-based software operating on the client device 112. Thus, a user operating web client device 120 may access the functions provided by the WAN server 104 and the data stored in the WAN server database 106 via the WAN 102, and achieve substantially the same results as a user accessing the PC-based SW client device 112 and the PC-based SW database. This is due to the mirroring or synchronization of the PC- and WAN-based databases 114 and 106, as well as the WAN server 104 providing substantially the same functions as the PC-based SW client device 112. The system 100 thus provides for the expansion of the PC-based SW system into a web-based SW system.

Additionally, the system 100 may be configured to operate much faster than the PC-based system by itself. In this regards, the WAN server 104 may be an up-to-date performing server with processing capabilities much greater than the processing capabilities of the PC-based SW client device 112. Thus, a user accessing the functionality of the WAN server 104 may observe much faster speeds than another user accessing the functionality of the PC-based SW client device 112. An additional benefit of the WAN server 104 is that it protects the PC-based database 114 by facilitating more usage (e.g., by multiple users) of the PC-based software via the WAN server 104 instead of via the PC-based client device 112. In this way, the PC-based client device 112 and database 114 may not be corrupted by traffic overload or other adverse impact due to over usage.

The system 100 may be configured to provide additional functions beyond the set provided by the PC-based software. For instance, as discussed above, the WAN server 104 may include substantially the same functions as that of the PC-based SW client device 112. As discussed above, this is to ensure that a user using the web client device 120 is able to perform the same operations as a user of the PC-based SW client device 112. However, the WAN server 104 may include additional functions to enhance the capabilities of the PC-based software. In this regards, a user of the web client device 120 may access these additional functions provided by the WAN server 104 via the WAN 102. And, as explained in more detail below, a user of the PC-based SW client device 112 may access these additional functions provided by the WAN server 104 via the middleware module 110 and WAN 102.

Figure 1B:
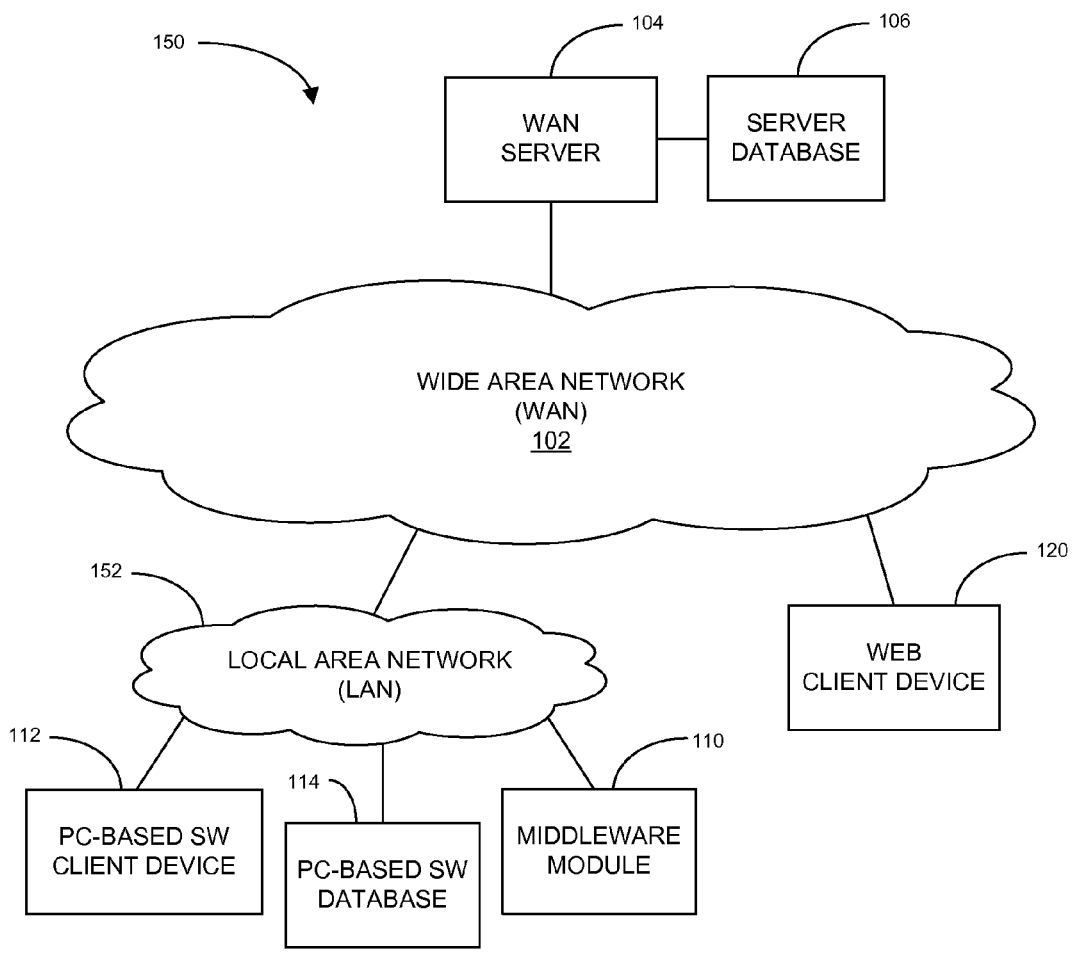
FIG. 1B illustrates a block diagram of another exemplary system for expanding the capabilities of a PC-based software in accordance with another aspect of the disclosure.

FIG. 1B illustrates a block diagram of another exemplary system 150 for expanding the capabilities of a PC-based software in accordance with another aspect of the disclosure. The system 150 is similar to that of system 100, and includes many of the same elements as indicated by the same reference numbers. In the system 150, however, the PC-based SW client device 112, the PC-based SW database 114, and the middleware module 110 are coupled to a local area network (LAN) 152 which, in turn, is coupled to the WAN 102. The operations of the system 150 are basically the same as that of system 100, except that some of the communications propagate through the LAN 152.

Figure 2A:
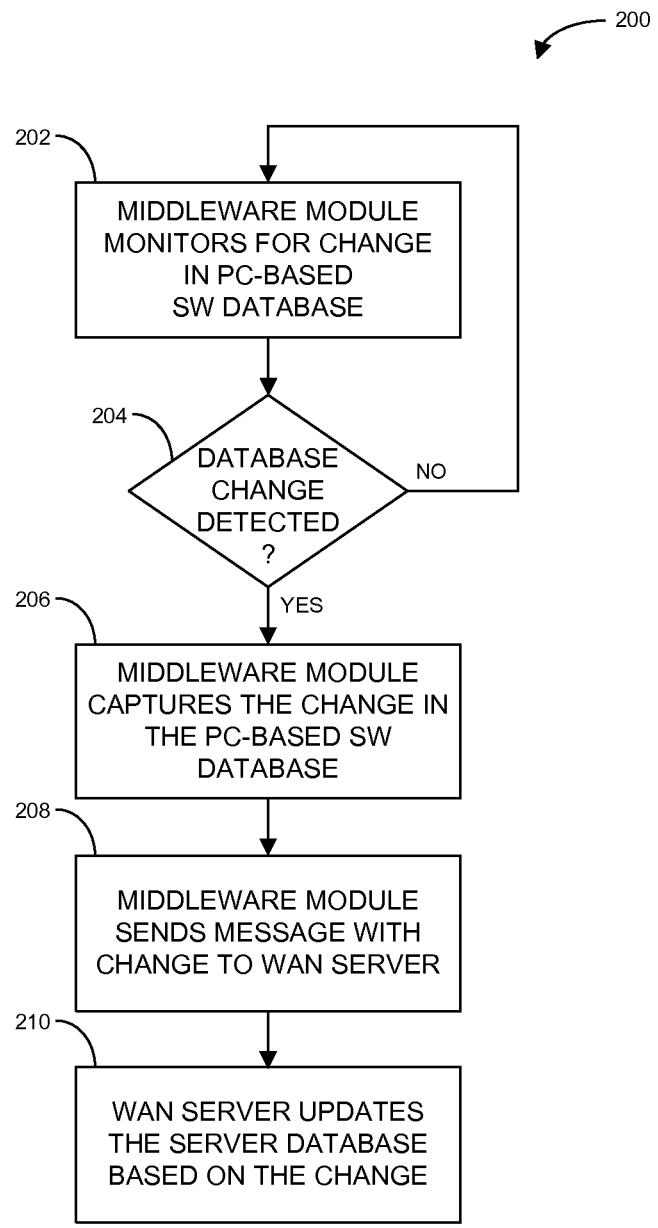
FIG. 2A illustrates a flow diagram of an exemplary method of synchronizing a PC-based software database with a WAN server database in accordance with another aspect of the disclosure.

FIG. 2A illustrates a flow diagram of an exemplary method 200 of synchronizing a PC-based software database with a WAN server database in accordance with another aspect of the disclosure. As discussed above, the middleware module 110 and the WAN server 104 operate together to ensure that the PC-based SW database 114 is synchronized with the WAN server database 106. In the exemplary method 200, the middleware module 110 and the WAN server 104 responds to a change to the PC-based SW database 114 made by a user of the PC-based SW client device 112. The synchronization method 200 described herein may be configured to operate very fast, such as by eliminating, minimizing or providing low-latency queuing of the updates to the WAN server database for synchronization purposes.

According to the method 200, the middleware module 110 monitors for a change in the PC-based SW database 114 (block 202). The middleware module 110 may monitor for changes in the PC-based SW database 114 in many distinct manners, such as in a periodic manner, other time-based manner, in response to a signal indicating a change to the database sent by the PC-based SW client device 112 or database 114, or by other manners. In block 204, the middleware module 110 determines whether a change has occurred to the PC-based SW database 114. If no change has been detected, the middleware module 110 continues to monitor the PC-based SW database 114 in accordance with block 202.

On the other hand, if the middleware module 110 detects a change in the PC-based SW database 114 in accordance with block 204, the middleware module 110 captures the change to the PC-based SW database (block 206). The middleware module 110 then sends a message including the change to the PC-based SW database 114 to the WAN server 104 by way of the WAN 102 (block 208). The middleware module 110 may use any one or many messaging protocols for the message, such as Extensible Messaging and Presence Protocol (XMPP) such as Jabber open-source, Advance Message Queuing Protocol (AMQP), and others. After the WAN server 104 receives the message, the WAN server updates the WAN server database 106 based on the change in order to synchronize the databases 106 and 114. (block 210). It shall be understood that the steps of the method 200, or of any other methods described herein, need not be performed in the order in which illustrated herein.

Figure 2B:
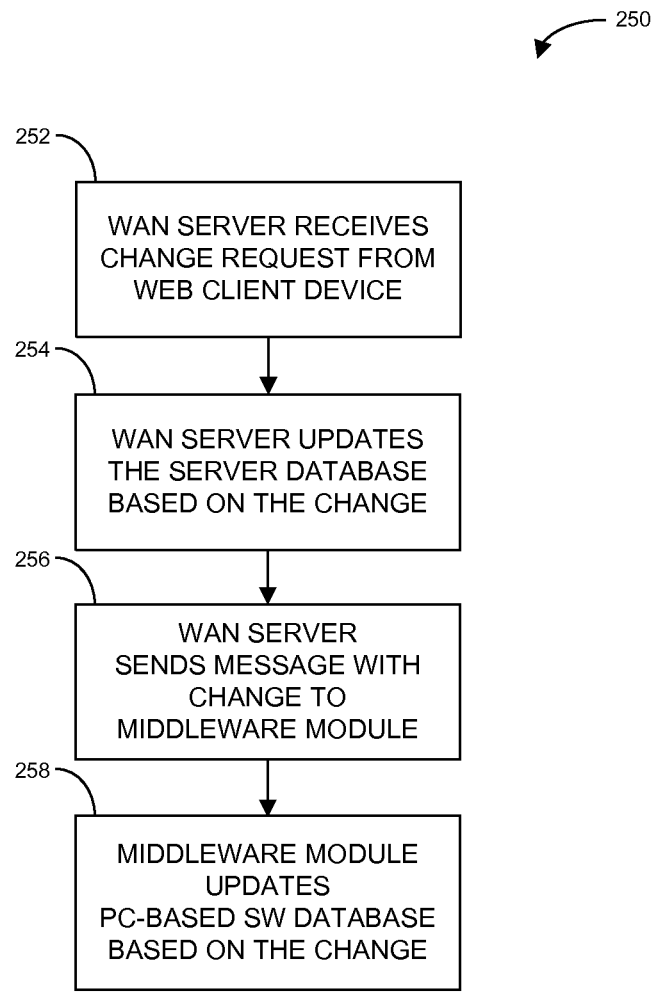
FIG. 2B illustrates a flow diagram of an exemplary method of synchronizing a WAN server database with a PC-based software database in accordance with another aspect of the disclosure.

FIG. 2B illustrates a flow diagram of an exemplary method 250 of synchronizing a WAN server database with a PC-based software database in accordance with another aspect of the disclosure. The method 250 is another example of a technique implemented by the WAN server 104 and middleware module 110 to synchronize the WAN server database 106 with the PC-based SW database 114. In this example, however, the WAN server 104 and middleware module 110 respond to a change to the WAN server database 106 made by a user of the web client device 120. Similarly, the synchronization method 250 described herein may be configured to operate very fast, such as by eliminating, minimizing or providing low-latency queuing of the updates to the PC-based SW database for synchronization purposes.

According to the method 250, the WAN server 104 receives a change request from the web client device via the WAN 102 (block 252). The change request may have been generated and transmitted by, for example, a user of the web client device 120 interacting with one or more static or dynamic webpages generated by the WAN server 104. In response to the change request, the WAN server 104 updates the WAN server database 106 based on the requested change (block 254). For synchronization purposes, the WAN server 104 then sends a message including the change to the middleware module 110 by way of the WAN 102 (block 256). Similarly, the WAN server 104 may use any of a number of messaging protocols to configure the message, such as XMPP, AMQP or other, as discussed above. The WAN server 104 may be further configured to detect the presence or active state of the middleware module 110 so that, in case the middleware module 110 is not present or active, the update to the PC-based SW database may be queued until the middleware module is present or becomes active. After the middleware module 110 receives the message, the middleware module updates the PC-based SW database 114 based on the change in order to synchronize the databases 106 and 114. (block 258). The middleware module 110 may update the PC-based SW database 114 directly or by instructing the PC-based SW device 112 to do so.

Figure 2C:
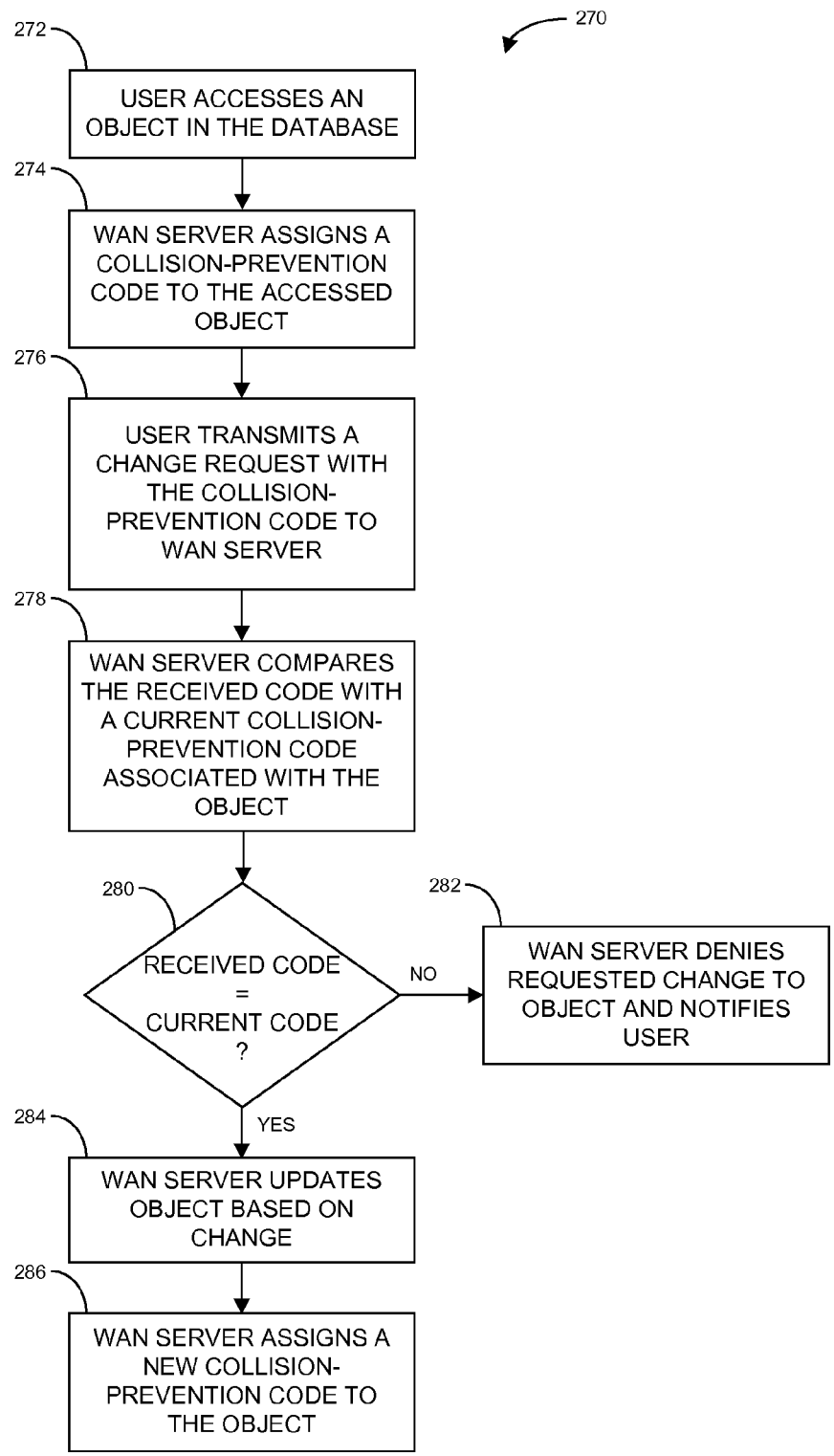
FIG. 2C illustrates a flow diagram of an exemplary method of preventing collision of actions with respect to a database object in accordance with another aspect of the disclosure.

FIG. 2C illustrates a flow diagram of an exemplary method 270 of preventing collision of actions with respect to a database object in accordance with another aspect of the disclosure. In summary, the method 270 entails the WAN server assigning a collision-prevention code to a database object being accessed, and provide the object and the code to the accessing user. If the user attempts to modify the object, the modification and code are provided to the WAN server. The WAN server then compares the received code with the current collision-prevention code, and if they match, allows the change to take place. If the codes do not match, which may mean that another user accessed the same object and has already implemented a change to the object, the WAN server denies the requested change. In such a case, the first user would have to access the object again in order to receive the current collision prevention code from the WAN server, and attempt to modify the object using the new code.

More specifically, a user accesses an object in the database (block 272). Because of the synchronization techniques previously discussed, the database is referred to herein generally, and could be either the PC-based SW database or the WAN server database. The WAN server 104 assigns a collision-prevention code to the accessed object and provides it to the user (block 274). The user then transmits a request to modify the object along with the collision-prevention code to the WAN server 104 (block 276). The WAN server 104 then compares the received code with a current collision-prevention code associated with the object (block 278).

If, in block 280, the WAN server 104 determines that the received code is not the same as the current collision-prevention code, the WAN server denies the requested change to the object and notifies the user of such (block 282). This may be the case where another user has accessed and modified the object, and thus, the current code has changed since the time the first user accessed the object. If, on the other hand, the WAN server 104 determines in block 280 that the received code is the same as the current collision-prevention code, the WAN server updates the object based on the requested change (block 284). The WAN server 104 assigns a new collision-prevention code to the object (block 286). In this way, the WAN server 104 prevents inconsistent modifications to the same object by multiple users.

Figure 3A:
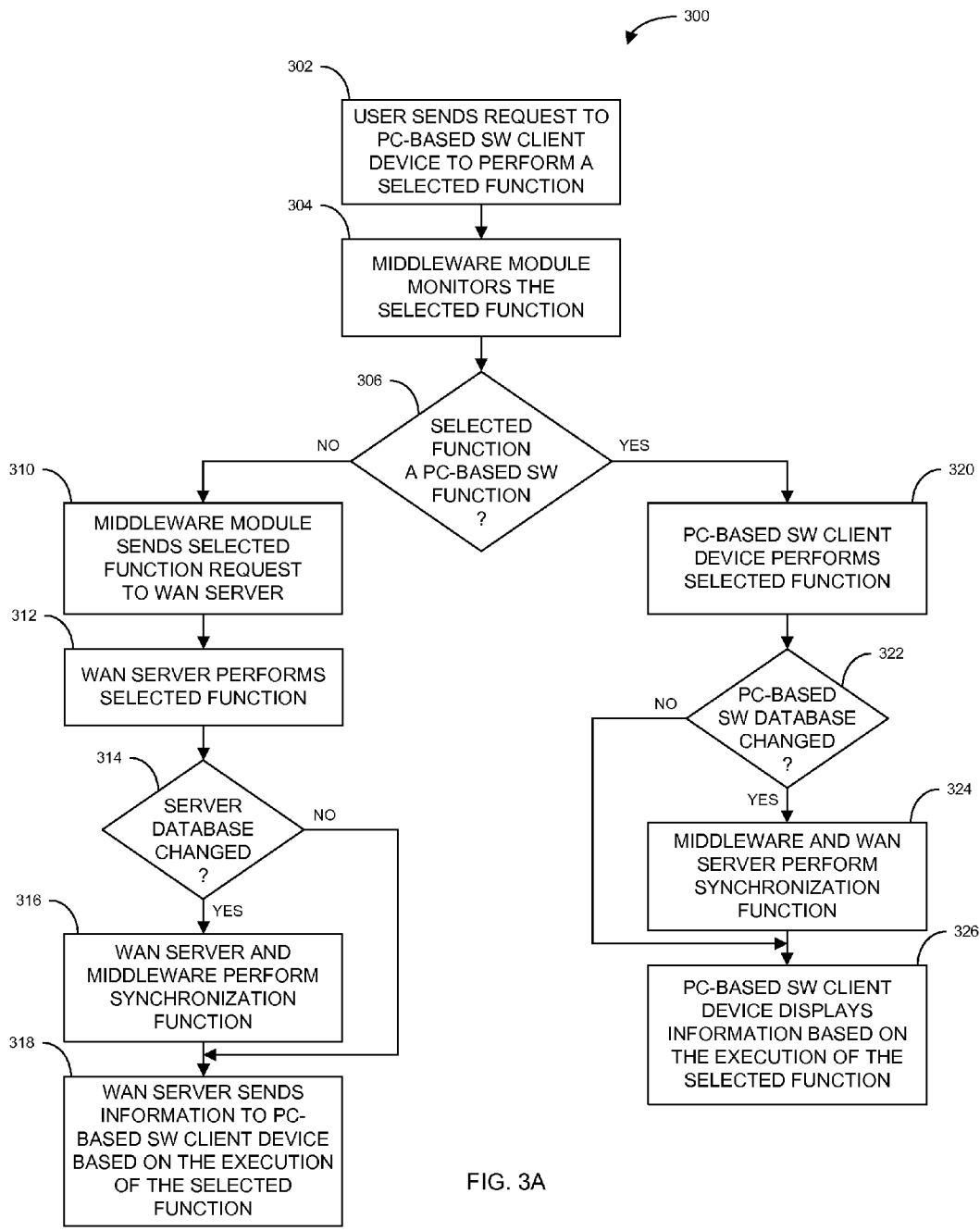
FIG. 3A illustrates a flow diagram of an exemplary method of processing a requested function in accordance with another aspect of the disclosure.

FIG. 3A illustrates a flow diagram of an exemplary method 300 of processing a requested function in accordance with another aspect of the disclosure. As previously discussed, the WAN server 104 may be configured to implement substantially the same functions as that of the PC-based SW client device 112. And, also as discussed above, the WAN server 104 may be configured to implement additional functions beyond the capabilities of the PC-based SW client device 112. In accordance with this example, a user of the PC-based SW client device 112 is requesting a function, which is processed in accordance as to whether the function may be executed by the PC-based SW client device 112 or may be implemented by the WAN server 104.

According to the method 300, a user sends a request to the PC-based SW client device 112 to perform a selected function (block 302). This may be the case where the user is operating the PC-based software running on the PC-based SW client device 112, and activates a soft button to request the execution of the selected function. The middleware module 110 monitors and subsequently detects the selected function (block 304). If the middleware module 110 detects that the selected function is able to be executed by the PC-based SW client device 112 per block 306, the middleware module 110 allows the PC-based SW client 112 to perform the selected function (block 320).

Once the PC-based SW client device 112 performs the selected function, for synchronization purpose, the middleware module 110 detects whether the PC-based SW database 114 has changed based on the execution of the selected function (block 322). If the execution of the selected function does not result in a change in the PC-based SW database 114, the middleware module 110 does not perform a synchronization operation, and the PC-based SW client device 112 may display information based on the execution of the selected function (block 326). This may be the case where the selected function was merely to access and display data from the PC-based SW database 114. On the other hand, if the execution of the selected function resulted in a change to the PC-based SW database 114, the middleware module 110 and WAN server 104 perform an operation to synchronize the databases 114 and 106 as per method 200 previously discussed (block 324). The method 300 then proceeds to block 326.

If in block 306, the middleware module 110 determines that the requested function may only be implemented by the WAN server 104, the middleware module sends the selected function request to the WAN server 104 by way of the WAN 102 (block 310). Similarly, as discussed above, the middleware module 110 may configure the request using any of a number of messaging protocols, such as XMPP, AMQP or other. After receiving the request, the WAN server 104 performs the selected function (block 312).

Then, the WAN server 104 determines whether the WAN server database 106 has changed due to the executed function (block 314). If the WAN server database 106 has not changed, the WAN server sends information to the PC-based SW client 112 by way of the WAN 102 and middleware module 110 based on the execution of the function (block 318). The WAN server 104 may send the information using one of many messaging protocols, as previously discussed. If, on the other hand, the WAN server 104 determines that the WAN server database 106 has changed because of the executed function, the WAN server 104 and middleware module 110 perform a synchronization operation as per method 250 previously discussed (block 316). The method 300 then proceeds to block 318.

Figure 3B:
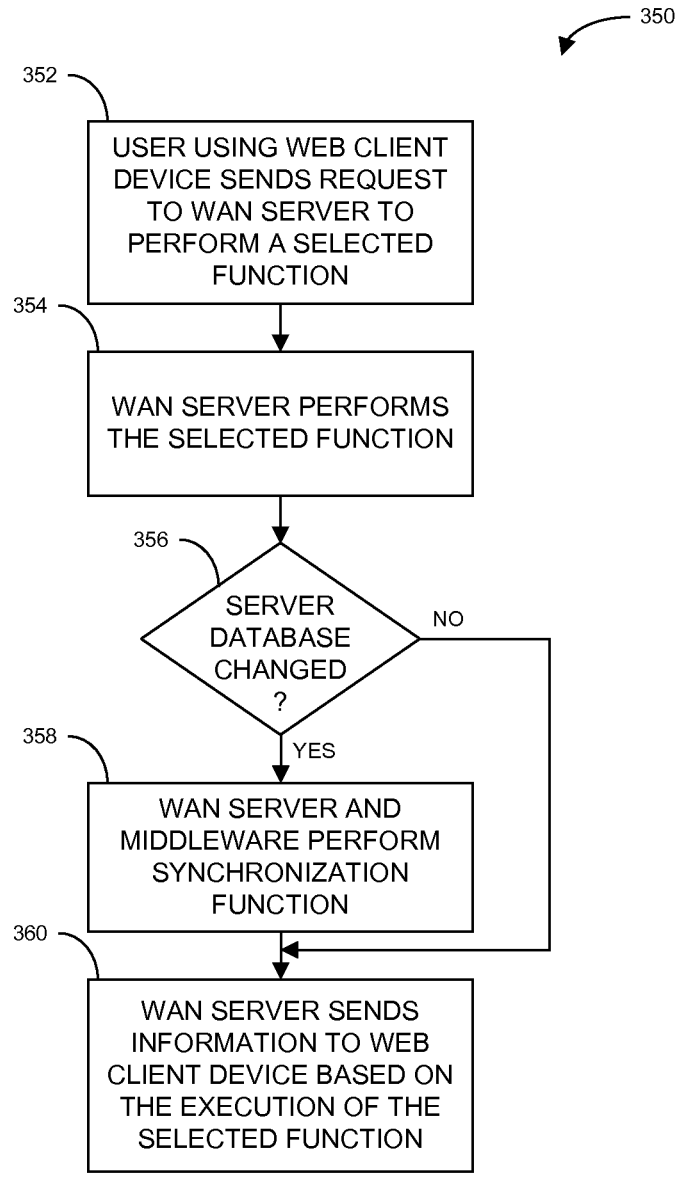
FIG. 3B illustrates a flow diagram of another exemplary method of processing a requested function in accordance with another aspect of the disclosure.

FIG. 3B illustrates a flow diagram of another exemplary method 350 of processing a requested function in accordance with another aspect of the disclosure. In the previous exemplary method 300, the selected function was requested by a user of the PC-based SW client device 112. In the exemplary method 350, on the other hand, the selected function is requested by a user of the web client device 120.

According to the method 350, a user of the web client device 120 sends a request to the WAN server 104 by way of the WAN 102 to perform a selected function (block 352). The selected function request may have been generated and transmitted by, for example, the user of the web client device 120 interacting with one or more static or dynamic webpages generated by the WAN server 104. After receiving the request, the WAN server 104 performs the selected function (block 354). The WAN server 104 then determines whether the WAN server database 106 has changed because of the executed function (block 356). If the WAN server database 106 has not changed, the WAN server 104 then sends information to the web client device 120 by way of the WAN 102 based on the execution of the selected function (block 360). If, on the other hand, it is determined that the WAN server database 106 has changed because of the executed function, the WAN server 104 and middleware module 110 perform a synchronization operation as per method 250 previously discussed (block 358). The method 300 then proceeds to block 360.

Figure 4:
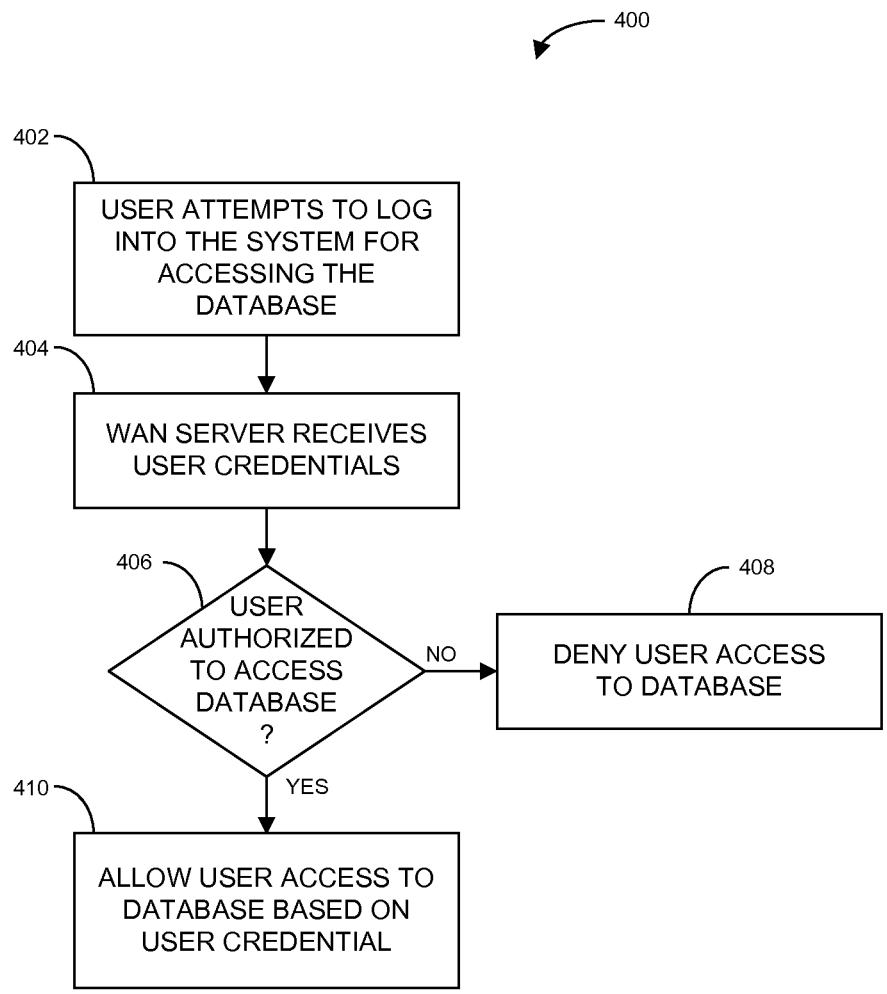
FIG. 4 illustrates a flow diagram of an exemplary security access method as an example of an expansion function in accordance with another aspect of the disclosure.

FIG. 4 illustrates a flow diagram of an exemplary security access method 400 as an example of an expansion function in accordance with another aspect of the disclosure. As previously discussed, the WAN server 104 may be configured to perform substantially the same functions as the PC-based SW client device 112 operating the PC-based software. However, as previously discussed, the WAN server 104 may be configured to provide functions beyond the capabilities of the PC-based software. For example, some accounting PC-based software, such as Quickbooks®, may not provide a security access to its database. Thus, the exemplary method 400 may serve as an additional function performed by the WAN server 104 that supplements the functions provided by a PC-based software.

According to the method 400, a user attempts to log into the system for accessing any one of the databases 114 and 106 (block 402). For instance, such user may attempt to access the system using the PC-based SW client device 112, or may attempt to access the system using the web client device 120. In attempting to access the system, the WAN server 104 receives the user credentials (block 404). For example, if the user is operating the PC-based SW client device 112, the user credentials may be captured by the middleware module 110 and provided to the WAN server 104 by way of the WAN 102. If the user is operating the web client device 120, the user credential may be provided to the WAN server 104 by way of the WAN 102.

After receiving the information, the WAN server 104 determines whether the user is authorized to access the databases 114 and/or 106 based on the user credential (block 406). If the WAN server 104 determines that the user is not authorized to access the databases 114 and/or 106, the WAN server 104 denies or prevents access to the databases 114 and/or 106 by the user (block 408). On the other hand, if the WAN server 104 determines that the user is authorized to access the databases 114 and/or 106, the WAN server 104 allows the user to access the databases 114 and/or 106 (block 410). Again, this is an example of adding a security access function to a PC-based software that lacks one.

Figure 5:
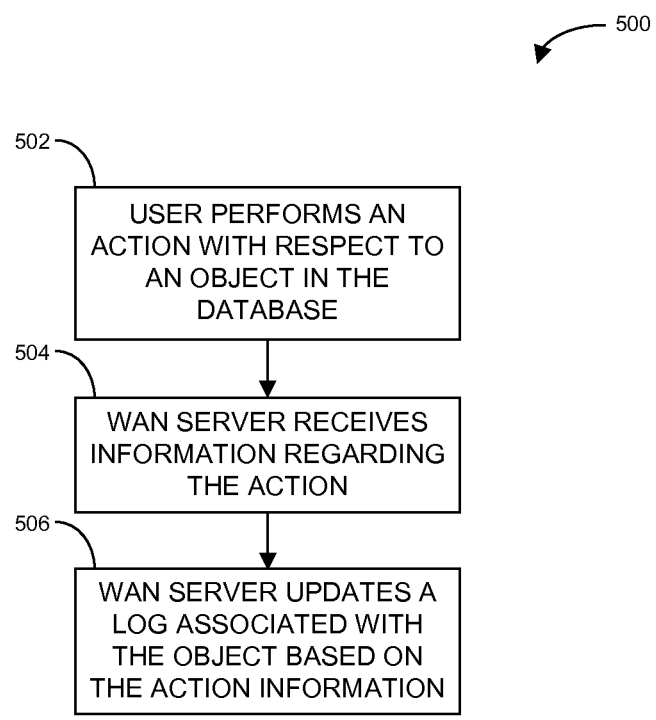
FIG. 5 illustrates a flow diagram of an exemplary method of generating an events log with respect to a database object as an example of another expansion function in accordance with another aspect of the disclosure.

FIG. 5 illustrates a flow diagram of an exemplary method 500 of generating an events log with respect to a database object as an example of another expansion function in accordance with another aspect of the disclosure. The method 500 is another example of supplementing a PC-based software with a function for generating a log based on actions performed with respect to a database object in any of the databases 106 and 114. The action may include, for example, creating the object, accessing the object, editing the object, deleting the object, copying information from the object, and others.

According to the method 500, a user performs an action with respect to an object in any of the databases 106 and 114 (block 502). Such user may perform the action with respect to the object using the PC-based SW client device 112 or the web client device 120. The WAN server 104 then receives the information regarding the action (block 504). If the user is accessing the object in the PC-based SW database 114, the middleware module 110 may provide the WAN server 104 the information by way of the WAN 104. If the user is using either the PC-based SW client device 112 or WEB client 120 to perform the action with respect to the object in the WAN server database 106, the WAN server 104 directly determines the action information. The WAN server 104 then creates or updates a log associated with the object based on the action information (block 506). The log may be accessible to a user, such as an authorized user, to keep track of actions with respect to the object for security or other reasons.

Figure 6:
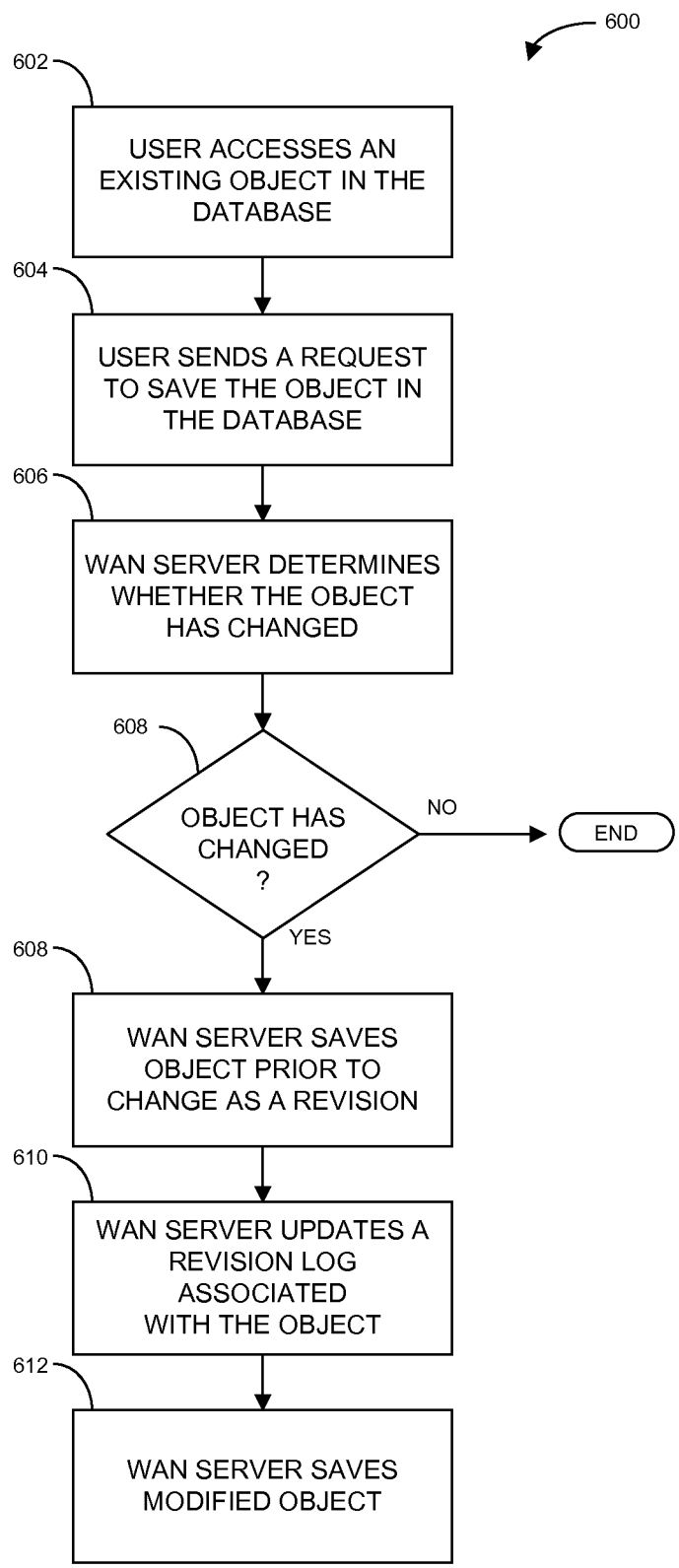
FIG. 6 illustrates a flow diagram of an exemplary method of generating a revisions log with respect to a database object as an example of another expansion function in accordance with another aspect of the disclosure.

FIG. 6 illustrates a flow diagram of an exemplary method 600 of generating a revisions log with respect to a database object as an example of another expansion function in accordance with another aspect of the disclosure. The method 600 is yet another example of supplementing a PC-based software with a function for generating a revisions log with respect to an existing object in any of the databases 106 and 114.

According to the method 600, a user accesses an existing object in any of the databases 106 and 114 (block 602). As previously discussed, the user may access the object using the PC-based client device 112 or the web client device 120. The user then sends a request to save the object in the database (block 604). The WAN server 104 then determines whether the object has changed (block 606). If the object has not change, the WAN server 104 may not perform any revision log operation with respect to the object. On the other hand, if the object has changed, the WAN server 104 saves the object as it existed prior to the change as a revision (block 608), updates a revision log associated with the object (block 610), and saves the modified object in the database (block 612).

Figure 7:
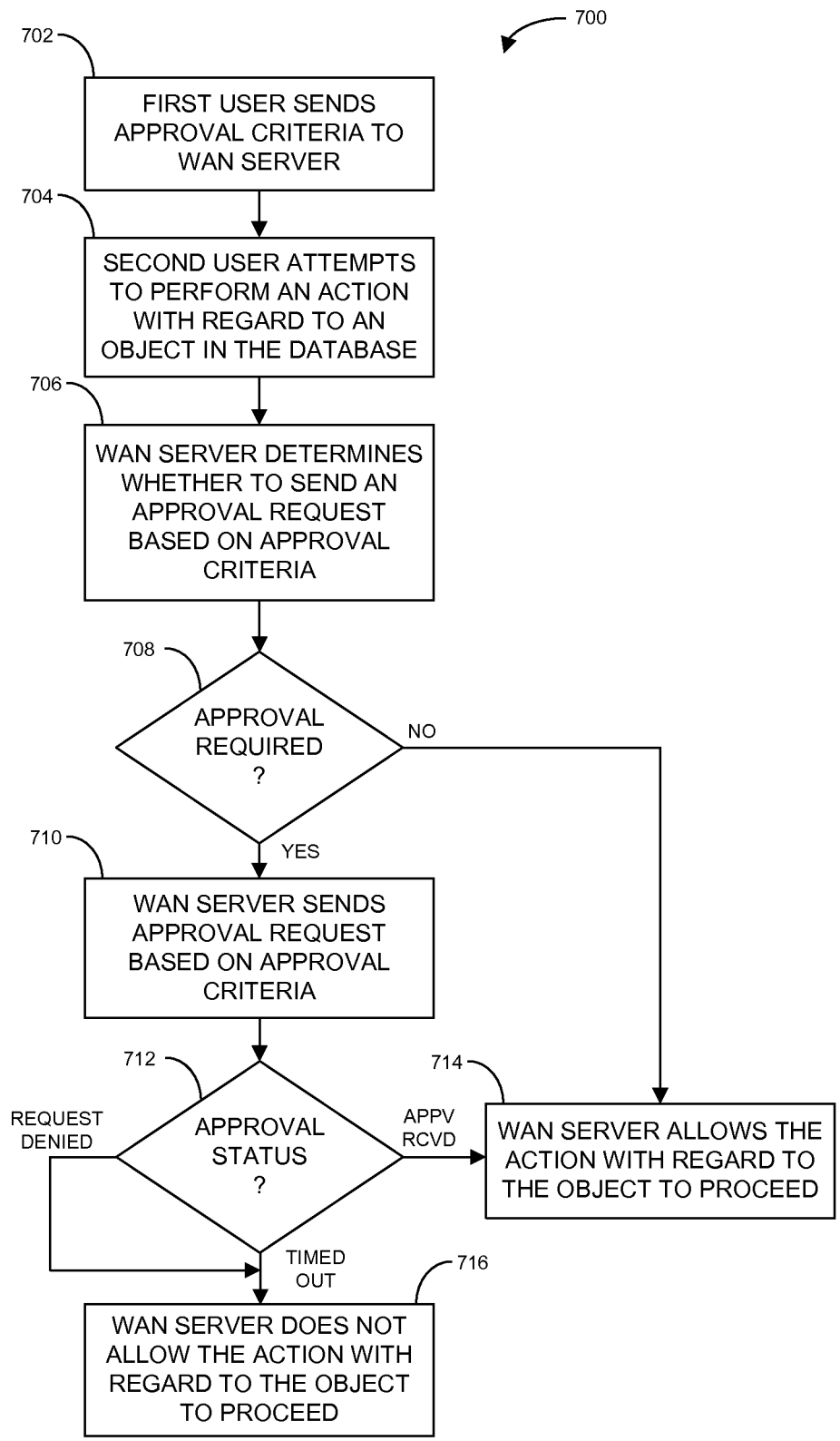
FIG. 7 illustrates a flow diagram of an exemplary method of approving an attempted action with respect to a database object as an example of another expansion function in accordance with another aspect of the disclosure.

FIG. 7 illustrates a flow diagram of an exemplary method 700 of approving an attempted action with respect to a database object as an example of another expansion function in accordance with another aspect of the disclosure. The method 700 is yet another example of supplementing a PC-based software with a function for providing an approval procedure for requested actions with respect to a database object.

According to the method 700, a first user sends an approval criteria to the WAN server 104 (block 702). As previously discussed, the first user may send the approval criteria using the PC-based client device 112 or the web client device 120. The approval criteria may identify a database object which is associated with an approval procedure, what one or more actions with respect to the database object require approval, and/or which users (e.g., the first user), may approve the one or more actions taken upon the database object. Then, according to the method 700, a second user attempts to perform an action with regard to the database object (block 704). The WAN server 104 then determines whether to send an approval request based on an approval criteria (if any) for the database object (block 706).

If, in block 708, the WAN server 104 determines that approval is not required, the WAN server allows the action with regard to the object to proceed (block 714). If, on the other hand, the WAN server 104 determines that approval is required in block 708, the WAN server sends an approval request based on the approval criteria (block 710). The WAN server 104 then determines the status of the approval request in block 712. If the approval has been received, the WAN server 714 allows the action with regard to the object to proceed (block 714). If the approval request is denied or not received within a defined time period (timed out), the WAN server 104 does not allow the action with regard to the object to proceed (block 716).

Figure 8:
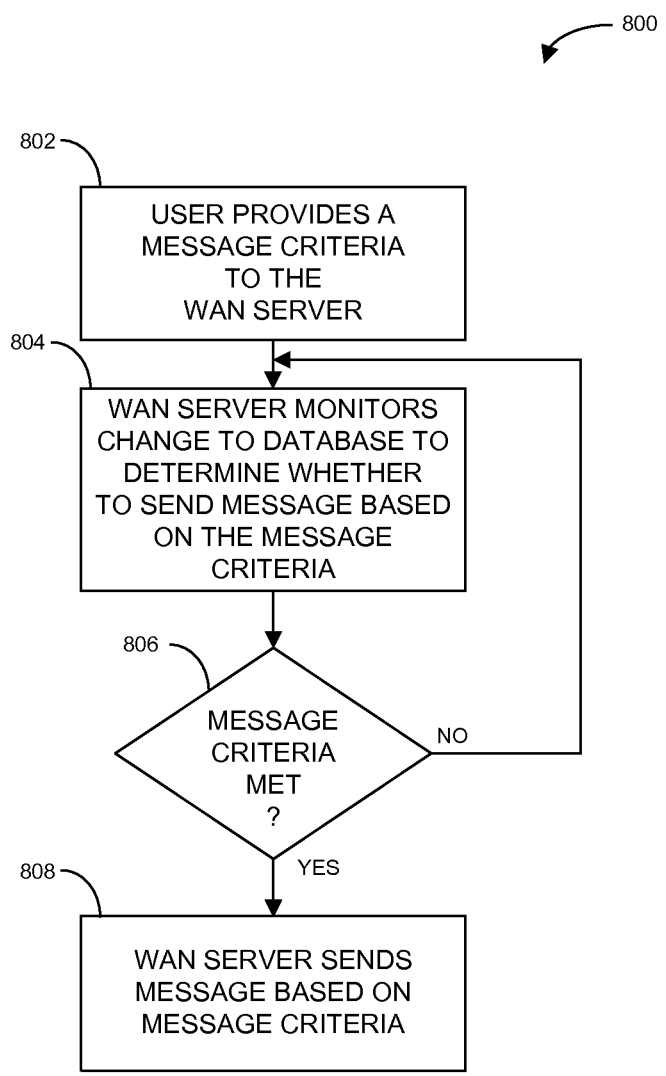
FIG. 8 illustrates a flow diagram of an exemplary method of generating and providing messages with respect to a database as an example of another expansion function in accordance with another aspect of the disclosure.

FIG. 8 illustrates a flow diagram of an exemplary method 800 of generating and providing messages with respect to a database as an example of another expansion function in accordance with another aspect of the disclosure. The method 800 is yet another example of supplementing a PC-based software with a function for providing messages with respect to changes to the database.

According to the method 800, a user provides a message criteria to the WAN server 104 using, for example, either the PC-based client device 112 or the web client device 120 (block 802). The message criteria may specify one or more conditions for sending a message, such as an alert, based on a change in the database, and which one or more users to send the message. The WAN server 104 then monitors the database to determine whether to send a message based on the message criteria (block 804). If the WAN server 104 determines that the message criteria has not been met in block 806, it continues to monitor the database per block 804. If, on the other hand, the WAN server 104 determines that the message criteria has been met in block 806, the WAN server 104 sends the message in accordance with the message criteria (block 808).

Figure 9:
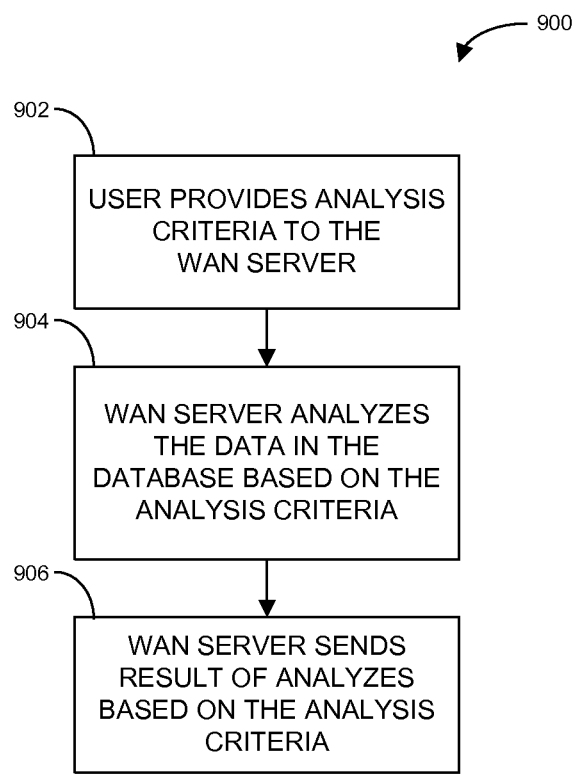
FIG. 9 illustrates a flow diagram of an exemplary method of generating an analysis report with respect to a database as an example of another expansion function in accordance with another aspect of the disclosure.

FIG. 9 illustrates a flow diagram of an exemplary method 900 of generating an analysis report with respect to a database as an example of another expansion function in accordance with another aspect of the disclosure. The method 900 is yet another example of supplementing a PC-based software with a function for providing an analysis report based on data in the database.

According to the method 900, a user provides an analysis criteria to the WAN server 104 using, for example, either the PC-based client device 112 or the web client device 120 (block 902). The analysis criteria may specify the data or object in the database upon which the analysis is to be performed, the particular one or more analyses to be performed on the data or objects, and to which user the analysis report is to be provided. The WAN server 104 then analyzes the data or object in the database based on the analysis criteria (block 904). The WAN server 104 then sends the result of the analysis or analysis report based on the analysis criteria (block 906).

Figure 10A:
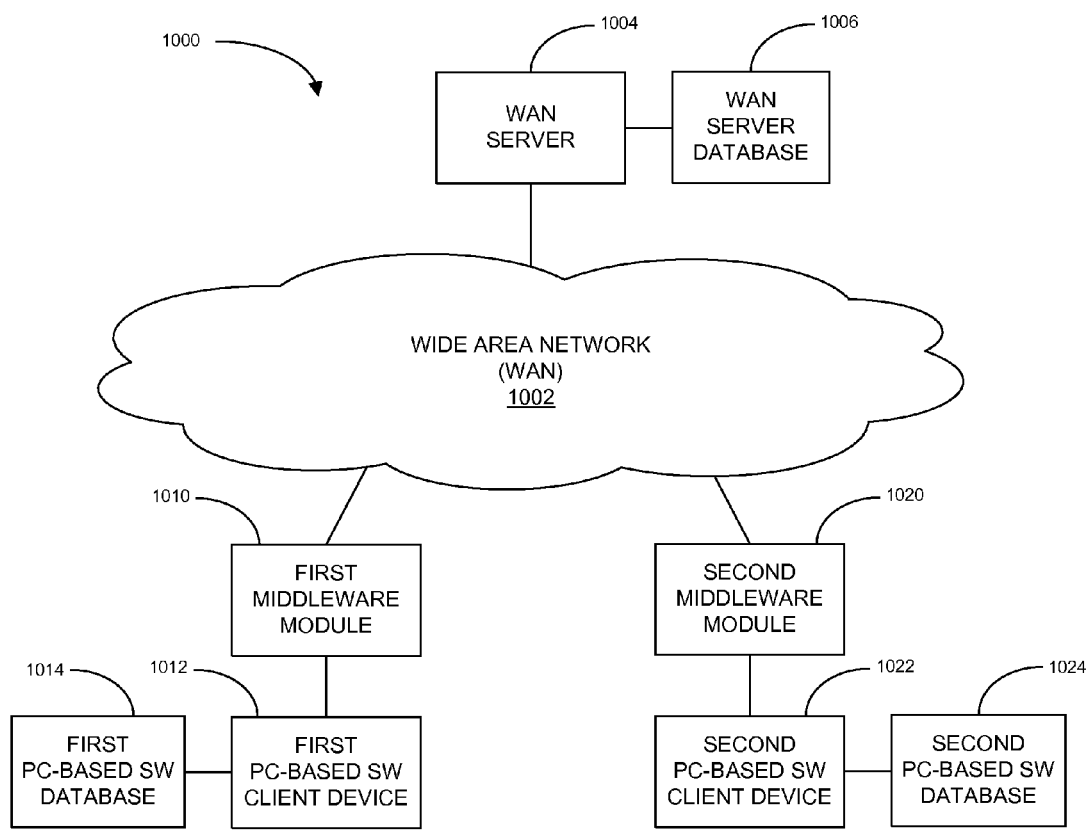
FIG. 10A illustrates a block diagram of an exemplary system for integrating a pair of PC-based software databases in accordance with another aspect of the disclosure.

FIG. 10A illustrates a block diagram of an exemplary system 1000 for integrating a pair of PC-based software databases in accordance with another aspect of the disclosure. As previously discussed, the mirroring or synchronization of a PC-based SW database and a WAN-based SW database allows for further expansion of the capabilities of the PC-based software. For instance, as discussed, a multitude of distinct functions may be added to the PC-based software by implementing these functions in a WAN server. Additionally, as discussed below, the WAN server may further assists in the integration or combining of distinct databases. In this example, the WAN server may be configured to integrate or combine distinct PC-based SW databases.

In particular, the system 1000 comprises a WAN 1002, a WAN server 1004 coupled to the WAN 1002, and a WAN server database 1006 coupled to the WAN server 1004. Additionally, the system 1000 comprises a first middleware module 1010 coupled to the WAN 1002, a first PC-based SW client device 1012 coupled to the first middleware module 1010, and a first PC-based SW database 1014 coupled to the first PC-based SW client device 1012. Further, the system 1000 comprises a second middleware module 1020 coupled to the WAN 1002, a second PC-based SW client device 1022 coupled to the second middleware module 1020, and a second PC-based SW database 1024 coupled to the second PC-based SW client device 1022.

As discussed below, the WAN server 1004 may serve to integrate the first PC-based SW database 1014 with the second PC-based SW database 1024 by receiving changes to the first PC-based SW database 1014, translating those changes to a format recognized by the second PC-based SW database 1024 (if the latter uses a different format), and sending the re-formatted change to the second PC-based SW database 1024. This operation may also work in the opposite direction. In effect, the WAN server 1004 synchronizes or mirrors the first PC-based database 1014 with the second PC-based SW database 1024.

Additionally, the WAN server 1004 may serve to integrate the first PC-based SW database 1014 with the second PC-based SW database 1024 by receiving changes to the first and second PC-based SW databases, and integrating the changes into the WAN server database 1006. In effect, the WAN server 1004 synchronizes or mirrors the PC-based databases 1014 and 1024 with the WAN server database 1006 such that the database 1006 includes data from both PC-based databases 1014 and 1024.

Figure 10B:
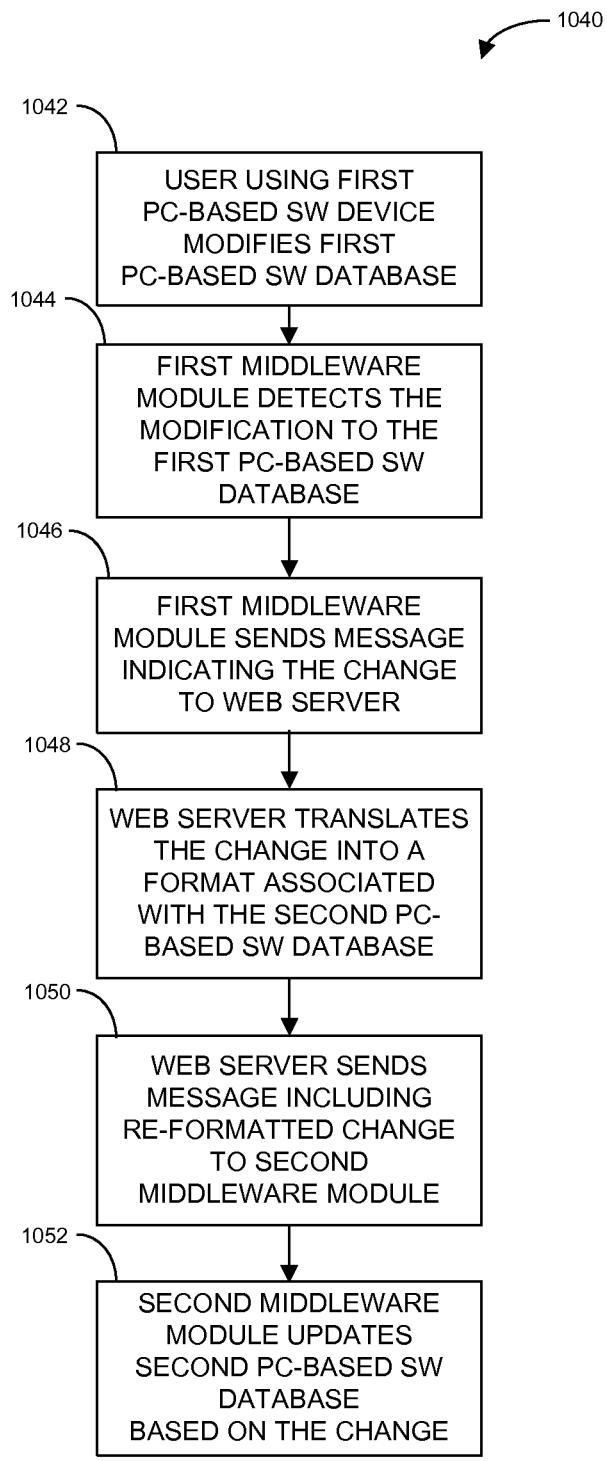
FIG. 10B illustrates a flow diagram of an exemplary method for integrating a pair of PC-based software databases in accordance with another aspect of the disclosure.

FIG. 10B illustrates a flow diagram of an exemplary method 1040 for integrating a pair of PC-based software databases in accordance with another aspect of the disclosure. The method 1040 is an example of how the WAN server 1004 synchronizes or mirrors the first PC-based database 1014 with the second PC-based SW database 1024. According to the method 1040, a user using the first PC-based SW device 1012 modifies the first PC-based SW database 1014 (block 1042). As previously discussed, the first middleware module 1010 detects the modification to the first PC-based SW database 1014 (block 1044). The first middleware module 1010 then sends a message including the modification details to the WAN server 1004 by way of the WAN 1002 (block 1046). As previously discussed, the first middleware module 1010 may send this message to the WAN server 1004 using any one of a number of messaging protocols, such as XMPP, AMQP or other.

If the second PC-based SW database 1024 uses a data storage protocol that is different than the protocol used by the first PC-based SW database 1014, the WAN server 1004 translates the change or modification to the format associated with the second PC-based SW database 1024 (block 1048). The WAN server 1004 then sends message including the re-formatted change or modification to the second middleware module 1020 by way of the WAN 1002 (block 1050). Similarly, the WAN server 1004 may send this message to the second middleware module 1020 using any one of a number of messaging protocols, such as XMPP, AMQP or other. The second middleware module 1020 then updates the second PC-based SW database 1024 based on the change (block 1052). This operation may be implemented in the opposite direction so that both the first and second PC-based databases 1014 and 1024 are synchronized. It shall be understood that the re-formatting of the modification may occur at the first or second middleware module, instead of at the WAN server 1004.

Figure 10C:
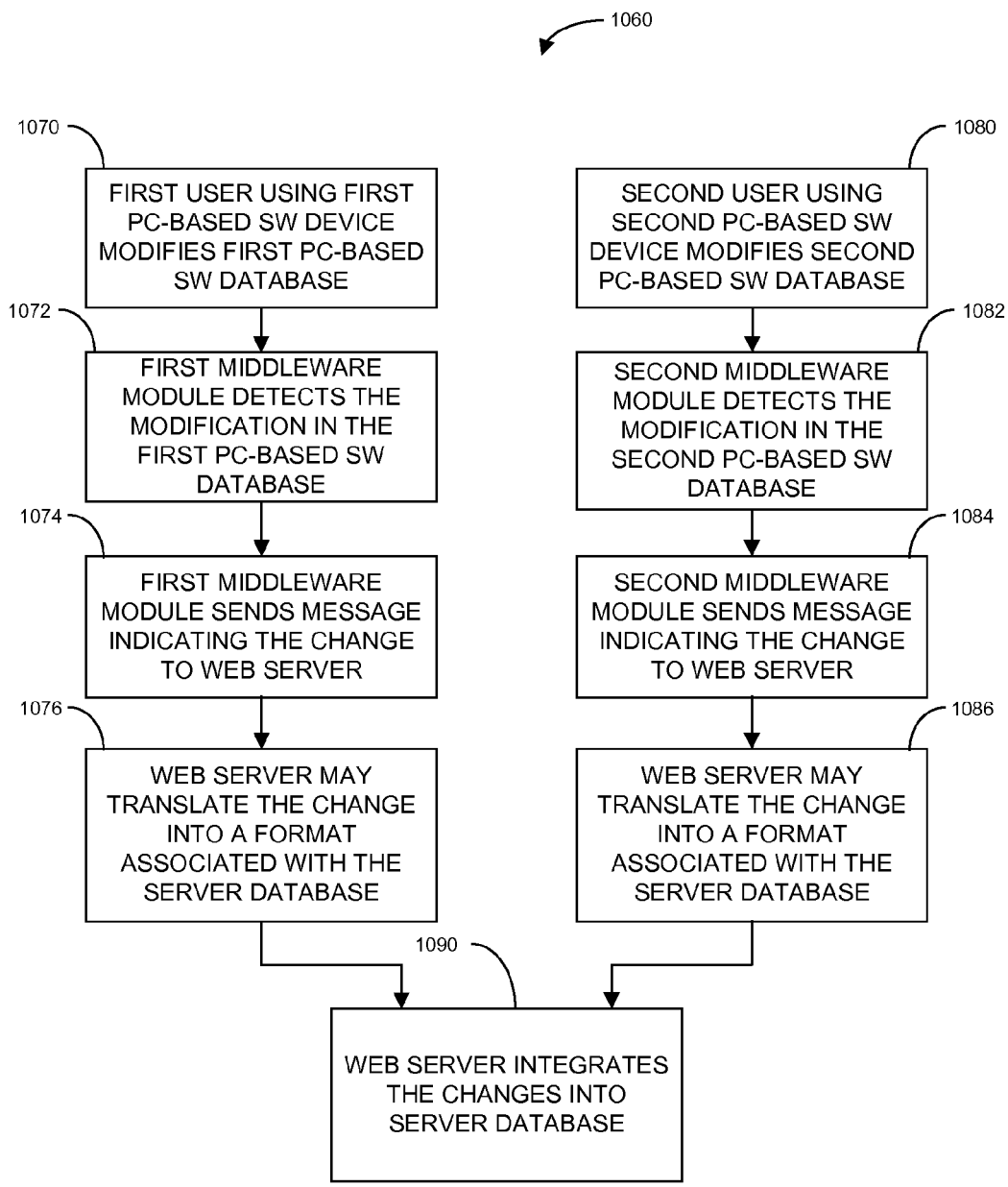
FIG. 10C illustrates a flow diagram of another exemplary method for integrating a pair of PC-based software databases in accordance with another aspect of the disclosure.

FIG. 10C illustrates a flow diagram of another exemplary method 1060 for integrating a pair of PC-based software databases in accordance with another aspect of the disclosure. The method 1060 is an example of how the WAN server 1004 synchronizes or mirrors both the first and second PC-based databases 1014 and 1024 to the WAN server database 1006, such that the WAN server database 1006 comprises data from both the first and second PC-based SW databases.

According to the method 1060, a first user using the first PC-based SW device 1012 modifies the first PC-based SW database 1014 (block 1070). The first middleware module 1010 detects the modification to the first PC-based SW database 1014 (block 1072). The first middleware module 1010 then sends a message including the modification details to the WAN server 1004 by way of the WAN 1002 (block 1074). The first middleware module 1010 may send this message to the WAN server 1004 using any one of a number of messaging protocols, such as XMPP, AMQP or other.

Similarly, a second user using the second PC-based SW device 1022 modifies the second PC-based SW database 1024 (block 1080). The second middleware module 1020 detects the modification to the second PC-based SW database 1024 (block 1082). The second middleware module 1020 then sends a message including the modification details to the WAN server 1004 by way of the WAN 1002 (block 1084). The second middleware module 1020 may send this message to the WAN server 1004 using any one of a number of messaging protocols, such as XMPP, AMQP or other.

After receiving the message from the first middleware module 1010, the WAN server 1004 may translate the change or modification into a format associated with the WAN server database 1006 (block 1076). Similarly, after receiving the message from the second middleware module 1020, the WAN server 1004 may translate the change or modification into a format associated with the WAN server database 1006 (block 1086). It shall be understood that the re-formatting of one or both of the modifications may occur respectively at the first or second middleware module, instead of at the WAN server 1004. The WAN server 1004 then integrates the changes or modification into the WAN server database 1006 (block 1090). In this way, the WAN server database 1006 may be synchronized with the combined first and second PC-based SW databases 1014 and 1024.

Figure 11A:
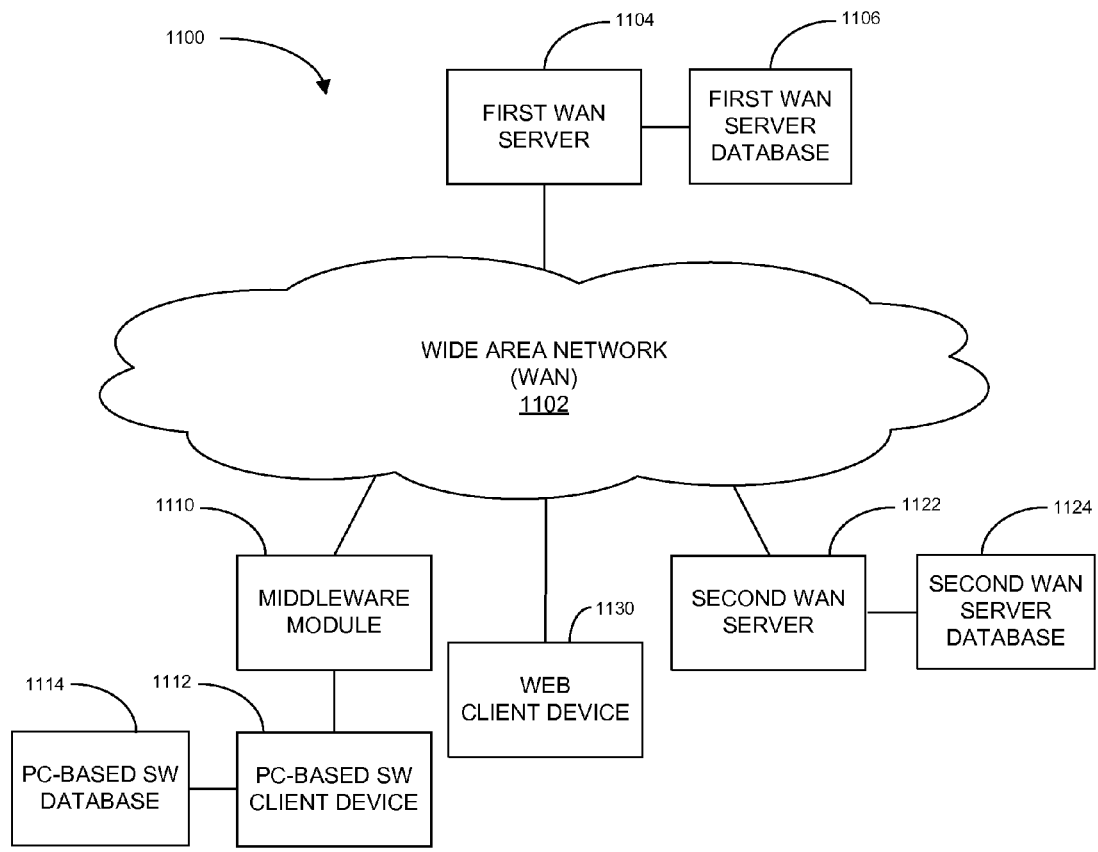
FIG. 11A illustrates a block diagram of an exemplary system for integrating a PC-based software database with a WAN-based software database in accordance with another aspect of the disclosure.

FIG. 11A illustrates a block diagram of an exemplary system 1100 for integrating a PC-based software database with a WAN-based software database in accordance with another aspect of the disclosure. In this example, the WAN server may be configured to integrate or combine databases of distinct types, such as a PC-based SW database and a WAN server database.

In particular, the system 1100 comprises a WAN 1102, a first WAN server 1104 coupled to the WAN 1102, and a first WAN server database 1106 coupled to the WAN server 1104. The system 1100 also comprises a second WAN server 1122 coupled to the WAN 1102, a second WAN server database 1124 coupled to the second WAN server 1122, and a WEB client device 1130 coupled to the WAN 1102. Additionally, the system 1100 comprises a middleware module 1110 coupled to the WAN 1102, a PC-based SW client device 1112 coupled to the middleware module 1110, and a PC-based SW database 1114 coupled to the PC-based SW client device 1112.

As discussed below in more detail, the first WAN server 1104 may serve to integrate the PC-based SW database 1114 with the second WAN server database 1124 by receiving changes to the PC-based SW database 1114, translating those changes to a format recognized by the second WAN server database 1124 (if the latter uses a different format), and sending the re-formatted change to the second WAN server database 1124. Similarly, the first WAN server 1104 may serve to integrate the WAN server database 1124 with the PC-based SW database 1114 by receiving changes to the WAN server database 1124, translating those changes to a format recognized by the PC-based SW database 1114 (if the latter uses a different format), and sending the re-formatted change to the PC-based SW database 1114. In effect, the first WAN server 1104 synchronizes both the PC-based database 1114 and the second WAN server database 1124.

Additionally, the first WAN server 1104 may serve to integrate the PC-based SW database 1114 with the second WAN server database 1124 by receiving changes to the PC-based SW and second WAN server databases, and integrating the changes into the WAN server database 1106. In effect, the first WAN server 1104 synchronizes or mirrors the databases 1114 and 1124 with the WAN server database 1106 such that the database 1106 includes data from both databases 1114 and 1124.

Figure 11B:
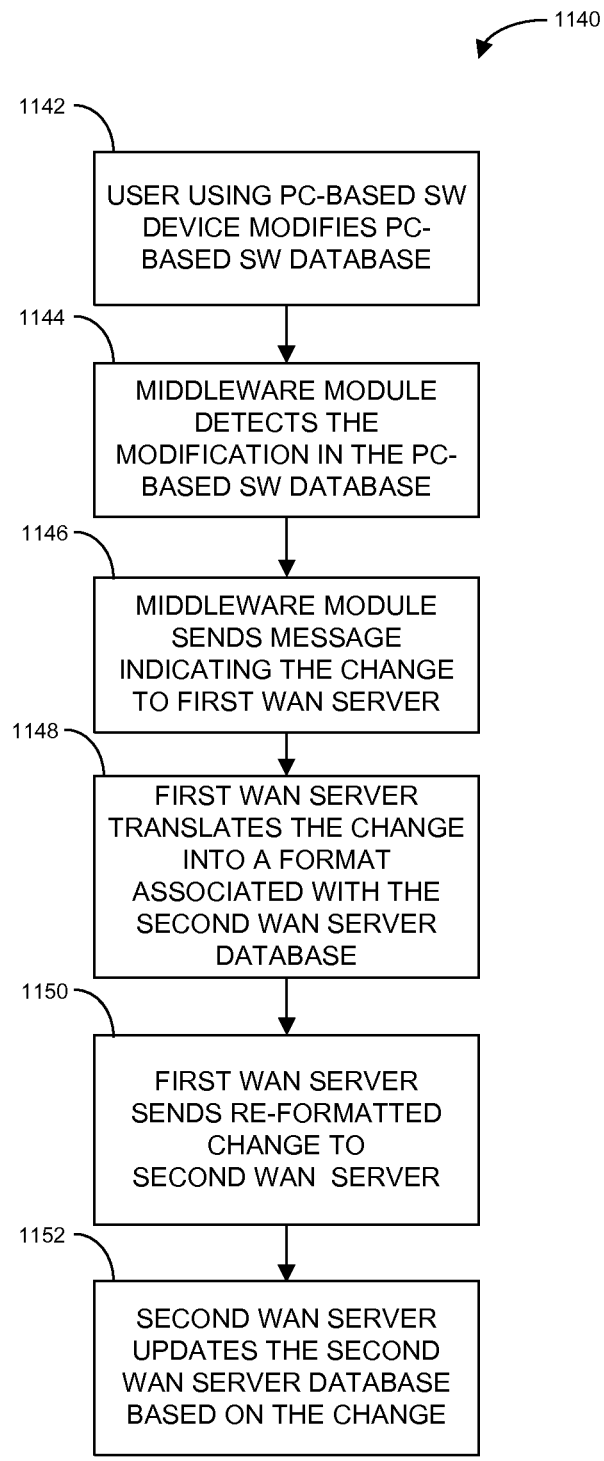
FIG. 11B illustrates a flow diagram of an exemplary method for integrating a PC-based software database with a WAN-based software database in accordance with another aspect of the disclosure.

FIG. 11B illustrates a flow diagram of an exemplary method 1140 for integrating a PC-based software database with a WAN server database in accordance with another aspect of the disclosure. The method 1140 is an example of how the first WAN server 1104 synchronizes or mirrors the PC-based SW database 1114 with the second WAN server database 1124. According to the method 1140, a user using the PC-based SW device 1112 modifies the PC-based SW database 1114 (block 1142). The middleware module 1110 detects the modification to the PC-based SW database 1114 (block 1144). The middleware module 1110 then sends a message including the modification details to the first WAN server 1104 by way of the WAN 1102 (block 1146). As previously discussed, the middleware module 1110 may send this message to the first WAN server 1104 using any one of a number of messaging protocols, such as XMPP, AMQP or other.

If the second WAN server database 1124 uses a data storage protocol that is different than the protocol used by PC-based SW database 1114, the first WAN server 1104 translates the change or modification to the format associated with the second WAN server database 1124 (block 1148). The first WAN server 1104 then sends message including the re-formatted change or modification to the second WAN server 1122 by way of the WAN 1102 (block 1150). It shall be understood that the re-formatting of the modification may occur at the first middleware module or the second WAN server, instead of at the WAN server 1004. Similarly, the first WAN server 1104 may send this message to the second WAN server 1122 using any one of a number of messaging protocols, such as XMPP, AMQP or other. The second WAN server 1122 then updates the second WAN server database 1124 based on the change (block 1152). Thus, the method 1140 synchronizes the PC-based SW database 1114 to the second WAN server database 1124.

Figure 11C:
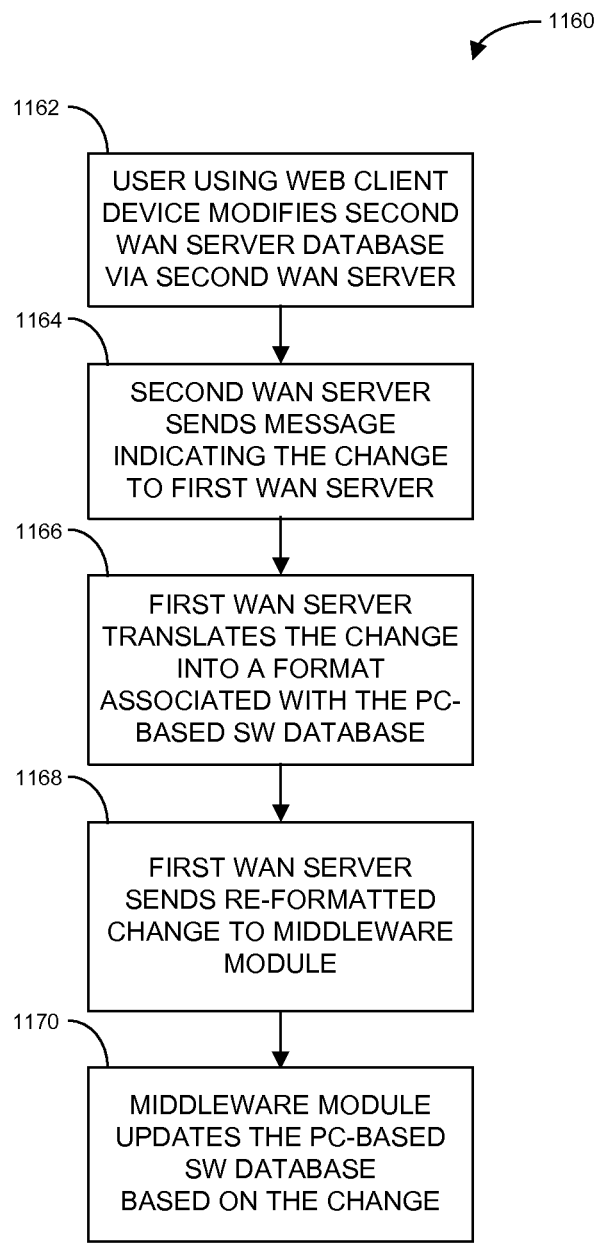
FIG. 11C illustrates a flow diagram of an exemplary method for integrating a WAN-based software database with a PC-based software database in accordance with another aspect of the disclosure.

FIG. 11C illustrates a flow diagram of an exemplary method 1160 for integrating a WAN server database with a PC-based SW database in accordance with another aspect of the disclosure. The method 1160 is an example of how the first WAN server 1104 synchronizes or mirrors the second WAN server database 1124 with the PC-based SW database 1114. According to the method 1160, a user using the web client device 1130 modifies the second WAN server database 1124 via the second WAN server 1122 (block 1162). This may be accomplished by the user interacting with one or more webpages provided by the second WAN server 1122 via the WAN 1102. The second WAN server 1122 then sends a message including the modification details to the first WAN server 1104 by way of the WAN 1102 (block 1164). The second WAN server 1122 may send this message to the first WAN server 1104 using any one of a number of messaging protocols, such as XMPP, AMQP or other.

If the PC-based SW database 1114 uses a data storage protocol that is different than the protocol used by second WAN server database 1124, the first WAN server 1104 translates the change or modification to the format associated with the PC-based SW database 1114 (block 1166). It shall be understood that the re-formatting of the modification may occur at the second WAN server or middleware module, instead of at the WAN server 1004. The first WAN server 1104 then sends message including the re-formatted change or modification to the middleware module 1110 by way of the WAN 1102 (block 1168). Similarly, the first WAN server 1104 may send this message to the middleware module 1110 using any one of a number of messaging protocols, such as XMPP, AMQP or other. The middleware module 1110 then updates the PC-based SW database 1114 based on the change (block 1170). Thus, the method 1160 synchronizes the second WAN server database 1124 to the PC-based SW database 1114.

Figure 11D:
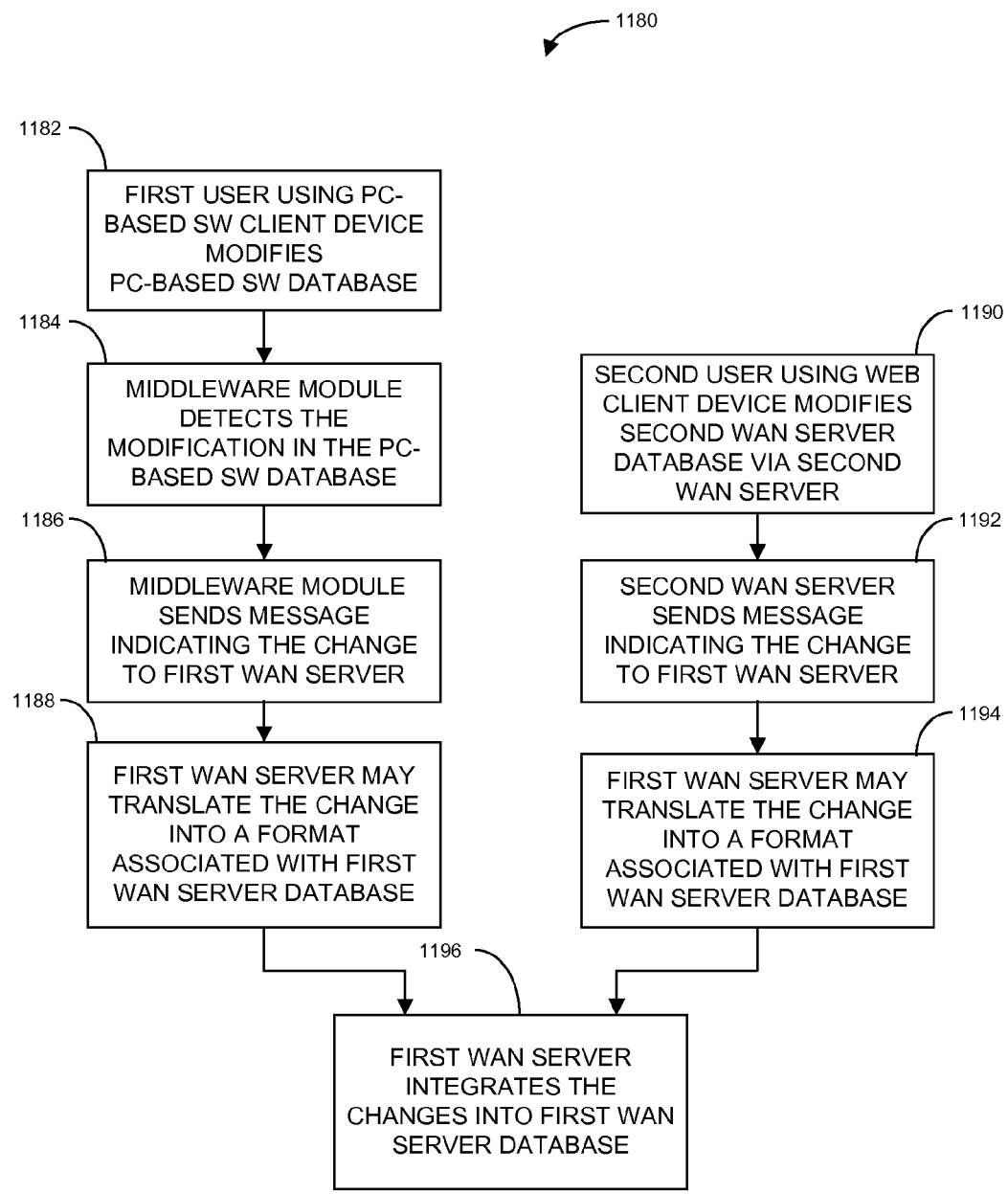
FIG. 11D illustrates a flow diagram of another exemplary method for integrating a PC-based software database with a WAN-based software database in accordance with another aspect of the disclosure.

FIG. 11D illustrates a flow diagram of another exemplary method 1180 for integrating distinct databases in accordance with another aspect of the disclosure. The method 1180 is an example of how the first WAN server 1104 synchronizes or mirrors the PC-based SW database 1114 and the second WAN server database 1124 to the WAN server database 1106, such that the WAN server database 1106 comprises data from both databases 1114 and 1124.

According to the method 1180, a first user using the PC-based SW device 1112 modifies the PC-based SW database 1114 (block 1182). The middleware module 1110 detects the modification of the PC-based SW database 1114 (block 1184). The middleware module 1110 then sends a message including the modification details to the first WAN server 1104 by way of the WAN 1102 (block 1186). The middleware module 1110 may send this message to the WAN server 1104 using any one of a number of messaging protocols, such as XMPP, AMQP or other.

Also, a second user using the web client device 1130 modifies the second WAN server database 1124 using the second WAN server 1122 (block 1190). This may be accomplished by the second user accessing one or more webpages provided by the second WAN server 1122 via the WAN 1102. The second WAN server 1122 then sends a message including the modification or change to the first WAN server 1104 by way of the WAN 1102 (block 1192). The second WAN server 1122 may send this message to the first WAN server 1124 using any one of a number of messaging protocols, such as XMPP, AMQP or other.

After receiving the message from the middleware module 1110, the first WAN server 1104 may translate the change or modification into a format associated with the first WAN server database 1106 (block 1192). Similarly, after receiving the message from the second WAN server 1122, the first WAN server 1104 may translate the change or modification into a format associated with the first WAN server database 1106 (block 1194). In blocks 1188 and 1194, it shall be understood that the re-formatting of the modification may occur at the middleware module or the second WAN server, instead of at the first WAN server 1104. The first WAN server 1104 then integrates the changes or modification into the first WAN server database 1106 (block 1196). In this way, the first WAN server database 1106 is synchronized with the combined PC-based SW database 1114 and second WAN server database 1124.

Figure 12A:
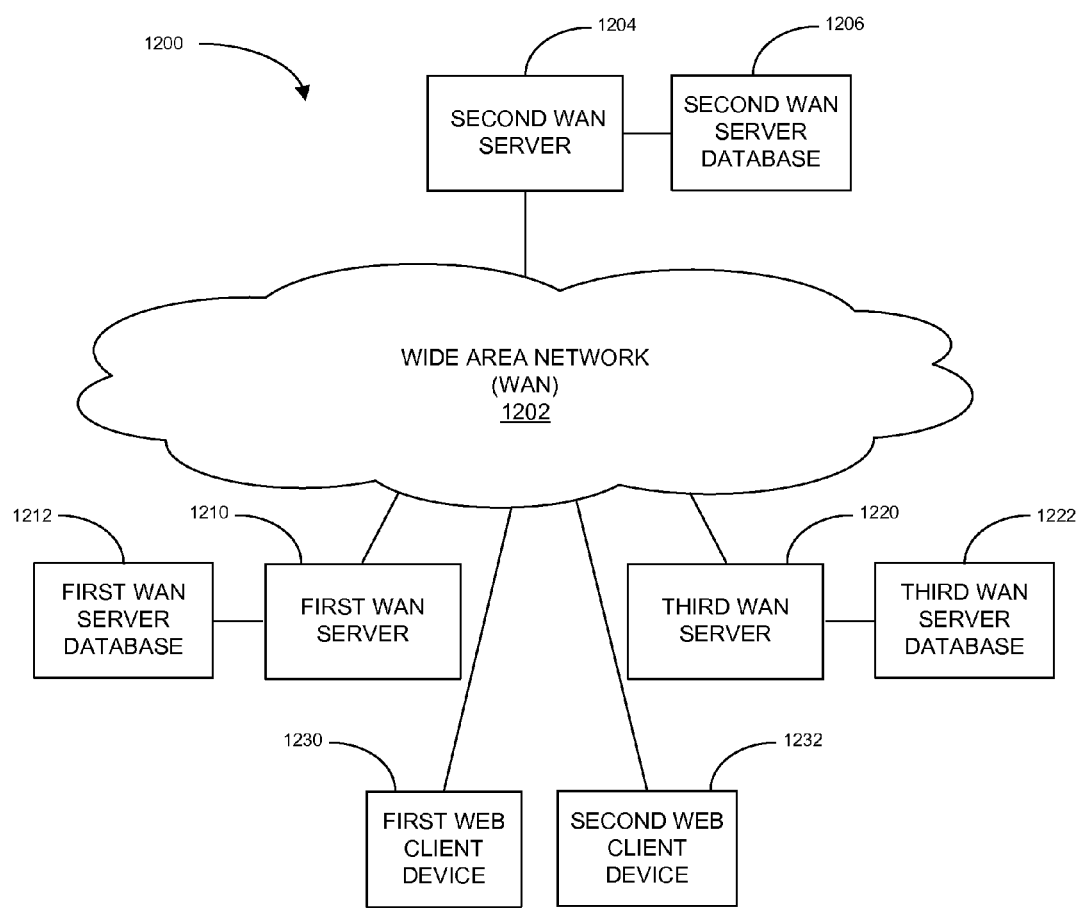
FIG. 12A illustrates a block diagram of an exemplary system for integrating a pair of WAN-based software databases in accordance with another aspect of the disclosure.

FIG. 12A illustrates a block diagram of an exemplary system 1200 for integrating a pair of distinct WAN server databases in accordance with another aspect of the disclosure. In particular, the system 1200 comprises a WAN 1202, a first WAN server 1210 coupled to the WAN 1202, and a first WAN server database 1212 coupled to the first WAN server 1210. The system 1200 also comprises a second WAN server 1204 coupled to the WAN 1202, and a second WAN server database 1206 coupled to the second WAN server 1204. Additionally, the system 1200 comprises a third WAN server 1220 coupled to the WAN 1202, and a third WAN server database 1222 coupled to the third WAN server 1220. Further, the system 1200 comprises first and second web client devices 1230 and 1232, both coupled to the WAN 1202.

As discussed below, the second WAN server 1204 may serve to integrate the first WAN server database 1212 with the third WAN server database 1222 by receiving changes to the first WAN server database 1212, translating those changes to a format recognized by the third WAN server database 1222 (if the latter uses a different format), and sending the re-formatted change to the third WAN server database 1222. This operation may also work in the opposite direction. In effect, the second WAN server 1204 synchronizes or mirrors the first WAN server database 1212 with the third WAN server database 1222.

Additionally, the second WAN server 1204 may serve to integrate the first WAN server database 1212 with the third WAN server database 1222 by receiving changes to the first and third WAN server databases, and integrating the changes into the second WAN server database 1206. In effect, the second WAN server 1204 synchronizes or mirrors the first and third WAN server databases 1212 and 1222 with the second WAN server database 1206 such that the database 1206 includes data from both databases 1212 and 1222.

Figure 12B:
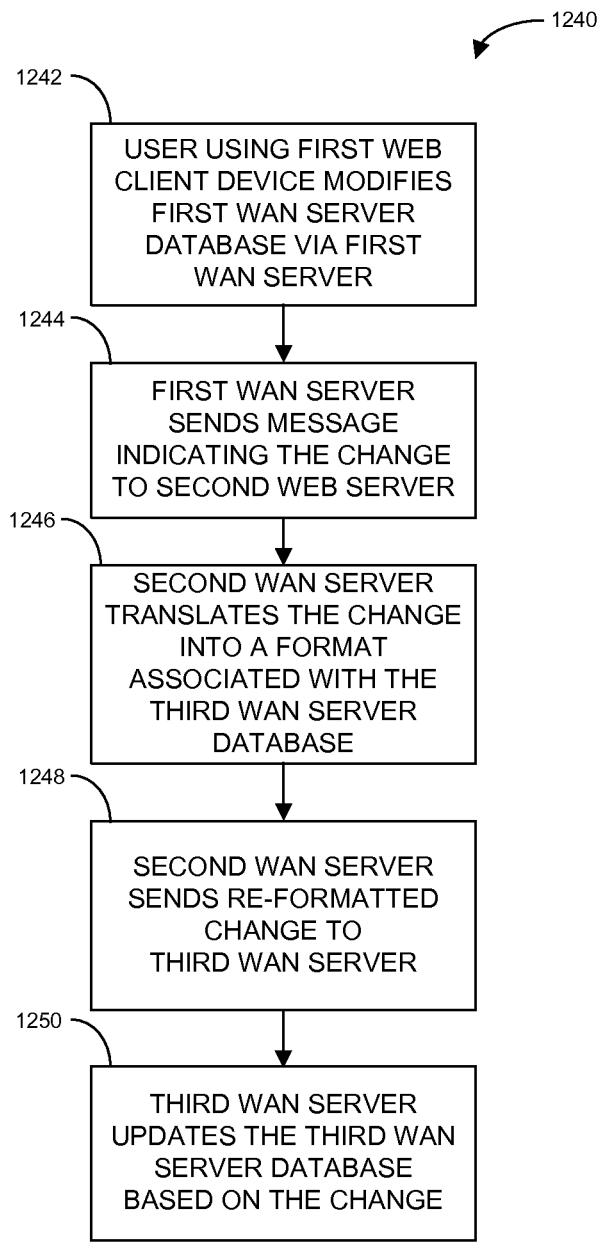
FIG. 12B illustrates a flow diagram of an exemplary method for integrating a pair of WAN-based software databases in accordance with another aspect of the disclosure.

FIG. 12B illustrates a flow diagram of an exemplary method 1240 for integrating a pair of WAN server databases in accordance with another aspect of the disclosure. The method 1240 is an example of how the second WAN server 1204 synchronizes or mirrors the first WAN server database 1212 with the third WAN server database 1222. According to the method 1240, a user using the first web client device 1230 modifies the first WAN server database 1212 using the first WAN server 1210 (block 1242). This may be accomplished by the user accessing one or more webpages provided by the first WAN server via the WAN 1202. The first WAN server 1210 then sends a message including the modification details to the second WAN server 1204 by way of the WAN 1202 (block 1244). The first WAN server 1212 may send this message to the second WAN server 1204 using any one of a number of messaging protocols, such as XMPP, AMQP or other.

If the third WAN server database 1222 uses a data storage protocol that is different than the protocol used by the first WAN server database 1212, the second WAN server 1204 translates the change or modification to the format associated with the third WAN server database 1222 (block 1246). It shall be understood that the re-formatting of the modification may occur at the first or third WAN server, instead of at the second WAN server. The second WAN server 1204 then sends message including the re-formatted change or modification to the third WAN server 1220 by way of the WAN 1202 (block 1248). Similarly, the second WAN server 1204 may send this message to the third WAN server database 1222 using any one of a number of messaging protocols, such as XMPP, AMQP or other. The third WAN server 1220 then updates the third WAN server database 1222 based on the change (block 1250). This operation may be implemented in the opposite direction so that both the first and third WAN server databases 1212 and 1222 are synchronized.

Figure 12C:
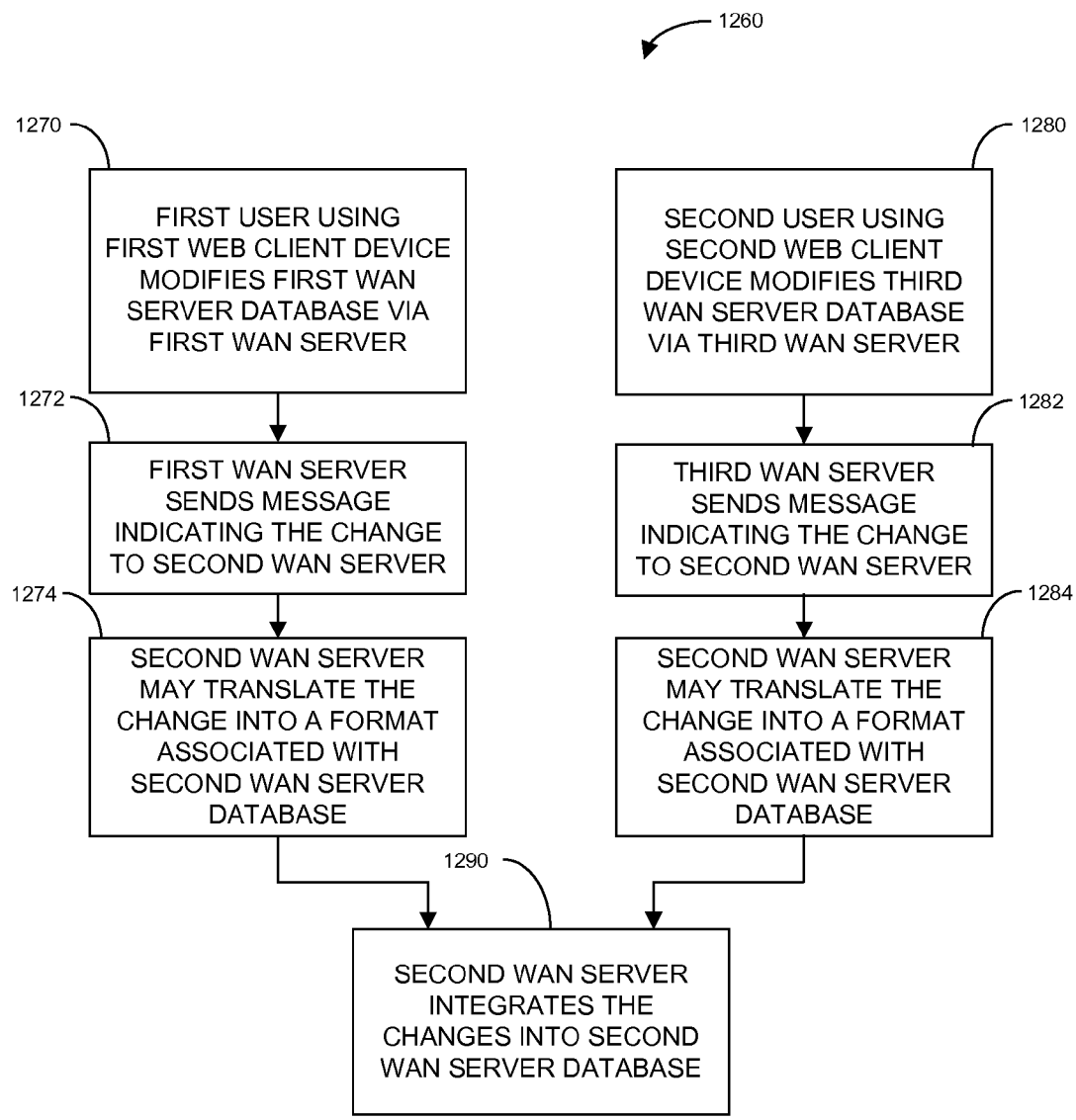
FIG. 12C illustrates a flow diagram of another exemplary method for integrating a pair of WAN-based software databases in accordance with another aspect of the disclosure.

FIG. 12C illustrates a flow diagram of another exemplary method 1260 for integrating a pair of WAN server databases in accordance with another aspect of the disclosure. The method 1260 is an example of how the second WAN server 1204 synchronizes or mirrors both the first and third WAN server databases 1212 and 1222 to the second WAN server database 1206, such that the second WAN server database 1206 comprises data from both the first and third WAN server databases.

According to the method 1260, a first user using the first web client device 1030 modifies the first WAN server database 1212 using the first WAN server 1210 (block 1270). This may be accomplished by the first user accessing one or more webpages provided by the first WAN server 1210 via the WAN 1202. The first WAN server 1210 then sends a message including the modification details to the second WAN server 1204 by way of the WAN 1202 (block 1272). The first WAN server 1210 may send this message to the WAN server 1204 using any one of a number of messaging protocols, such as XMPP, AMQP or other.

Similarly, a second user using the second web client device 1232 modifies the third WAN server database 1222 using the third WAN server 1220 (block 1280). This may be accomplished by the second user accessing one or more webpages provided by the third WAN server 1220 via the WAN 1202. The third WAN server 1220 then sends a message including the modification details to the second WAN server 1204 by way of the WAN 1202 (block 1284). The third WAN server 1220 may send this message to the second WAN server 1204 using any one of a number of messaging protocols, such as XMPP, AMQP or other.

After receiving the message from the first WAN server 1210, the second WAN server 1204 may translate the change or modification into a format associated with the second WAN server database 1206 (block 1274). Similarly, after receiving the message from the third WAN server 1220, the second WAN server 1204 may translate the change or modification into a format associated with the second WAN server database 1206 (block 1284). In blocks 1274 and 1284, it shall be understood that the re-formatting of the modification may occur at the first or third WAN server, instead of at the second WAN server. The second WAN server 1204 then integrates the changes or modification into the second WAN server database 1206 (block 1290). In this way, the second WAN server database 1206 is synchronized with the combined first and third WAN server databases 1212 and 1232.

Figure 13:
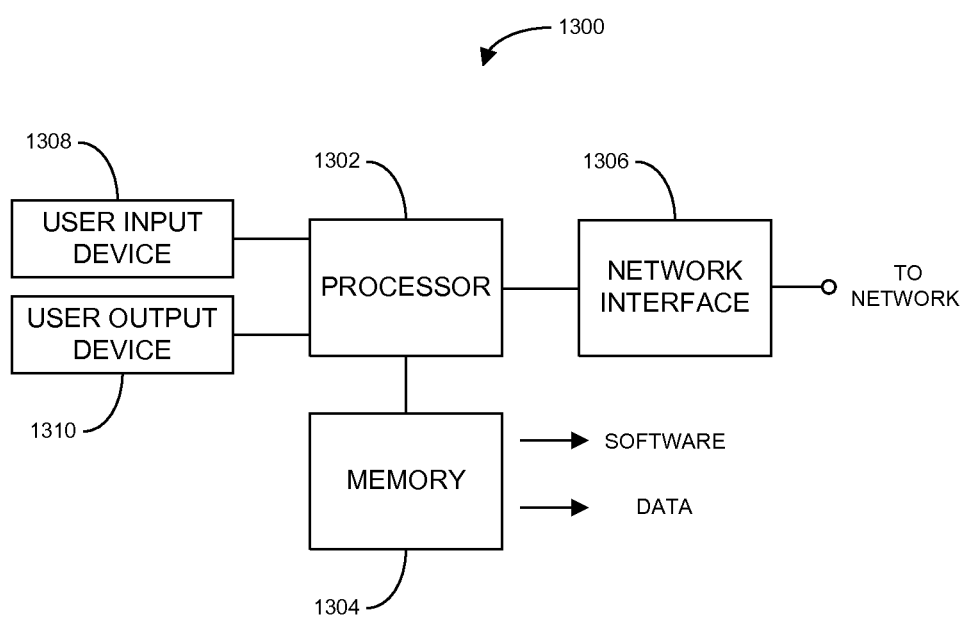
FIG. 13 illustrates a block diagram of an exemplary device in accordance with another aspect of the disclosure.

FIG. 13 illustrates a block diagram of an exemplary device 1300 in accordance with another aspect of the disclosure. All of the devices described herein, such as the middleware module, servers, PC-based client device and web client device may be a processor-based system. The exemplary device 1300 is an example of a processor-based system. The device 1300 comprises a processor 1302, a memory 1304, a network interface 1306, a user input device 1308, and a user output device 1310.

The processor 1302 performs the intended functions of the device 1300 under the control of software residing in the memory 1304. The memory 1304, which may be any type of computer readable medium such as hard disk, flash memory, EEPROM, CD-ROM, optical disc, and other memory technology, also stores data for processing by the processor 1302. The device 1300 further comprises a network interface 1306 for transmitting and receiving information to and from another device via a network, such as a WAN or LAN as previously described.

The device 1300 further comprises a user input device 1308, such as a keyboard, mouse, microphone, etc., coupled to the processor 1302 for allowing a user to provide information and control to the processor 1302. Additionally, the device 1300 comprises a user output device 1310, such as a display, speaker, etc. coupled to the processor 1302 for providing information to a user. The processor-based device 1300 need not have all of the elements described herein.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A system, comprising:
   one or more processor-based devices configured to execute:
   a PC-based software module adapted to implement a first change to a PC-based software database based on an input from a user, wherein the PC-based software module includes a first set of functions for modifying data in the PC-based software database; and
   a middleware module, separate from the PC-based software module, adapted to:
   detect a first change to a PC-based software database;
   transmit a first message including information related to the first change to a WAN server by way of a wide area network (WAN);
   determine whether a requested function of the input initiated by the user falls within the first set of functions or within a second set of functions, wherein the WAN server includes the second set of functions for modifying data in a WAN server database, the second set of functions being different than the first set of functions; and
   transmit a command to perform the requested function to the WAN server in response to determining that the requested function falls within the second set of functions and not within the first set of functions; and
   the WAN server adapted to:
   receive the first message from the middleware module by way of the WAN; and
   modify the WAN server database based on the first change information to synchronize the data in the WAN server database with the data in the PC-based software database, wherein the second set of functions includes a particular data analysis function associated with the synchronized data in the WAN server database and the PC-based software database, wherein the particular data analysis function is not in the first set of functions.

2. The system of claim 1, wherein the middleware module is adapted to detect the first change in the PC-based software database on a time-scheduled basis.

3. The system of claim 2, wherein the time-scheduled basis is periodic.

4. The system of claim 1, wherein the middleware module is adapted to detect the first change in the PC-based software database in response to receiving a signal indicating that the first change has taken place.

5. The system of claim 1, wherein the middleware module is adapted to transmit the first message using a messaging protocol.

6. The system of claim 5, the messaging protocol comprises an Extensible Messaging and Presence Protocol (XMPP).

7. The system of claim 5, the messaging protocol comprises an Advance Message Queuing Protocol (AMQP).

8. The system of claim 1, further comprising a local area network (LAN) coupled to the one or more processor-based devices.

9. The system of claim 8, wherein the middleware module is adapted to transmit the first message to the WAN server by way of the LAN.

10. The system of claim 1, further comprising the PC-based software database.

11. The system of claim 1, further comprising the WAN server database.

12. The system of claim 1, wherein the WAN server is further adapted to:
   receive a second message including a request to perform a second change to the WAN server database;
   modify the WAN server database based on the request; and
   transmit a third message including information related to the second change to the middleware module by way of the WAN.

13. The system of claim 12, wherein the WAN server is further adapted to receive the second message from a web client device by way of the WAN.

14. The system of claim 12, wherein the middleware module is further adapted to:
receive the third message from the WAN server by way of the WAN; and
modify the PC-based software database based on the second change information.

15. The system of claim 1, wherein the PC-based software module is adapted to effectuate the first change to the PC-based software database based on at least one function of the first set of functions.

16. The system of claim 15, wherein the first and second sets of functions have a plurality of functions in common.

17. The system of claim 1, wherein the WAN server is adapted to:
receive a request to perform one or more functions of the second set of functions;
modify the WAN server database based on the performance of the requested one or more functions; and
transmit information related to the modification of the WAN server database to the middleware module by way of the WAN.

18. The system of claim 1, wherein the WAN server is adapted to assign a collision-prevention code to a database object to prevent inconsistent modifications to the object by multiple users.

19. The system of claim 1, wherein the middleware module is configured to:
detect a request to perform the particular analysis function to the data in the PC-based software database initiated by the user;
transmit information concerning the request to the WAN server; and
wherein the WAN server is configured to perform the requested analysis of the data in response to receiving the information from the middleware module.

20. A system, comprising:
a WAN server adapted to:
receive a first message including a request to perform a first change to a WAN server database;
modify the WAN server database based on the request in accordance with one or more functions of a first set of functions;
transmit a second message including information related to the modification to a middleware module by way of a WAN; and
one or more processor-based devices adapted to execute:
a PC-based software program adapted to implement a second change to a PC-based software database in accordance with one or more functions in a second set of functions based on an input from a user, the second set of functions being different than the first set of functions, and wherein the first set of functions includes a particular data analysis function associated with synchronized data in the WAN server database and the PC-based software database, wherein the particular data analysis function is not in the second set of functions; and
the middleware module, separate from the PC-based software program, adapted to:
receive the second message from the WAN server by way of the WAN;
modify the PC-based database based on the modification to synchronize the data in the PC-based software database with the data in the WAN server database;
determine whether a requested function initiated by a user falls within the first set of functions or within a second set of functions; and
transmit a command to perform the requested function to the WAN server in response to determining that the requested function falls within the first set of functions and not within the second set of functions.

21. The system of claim 20, wherein the first and second sets of functions have a plurality of functions in common.

22. A system, comprising:
a first network device;
a first database coupled to the first network device;
a second network device;
a second database coupled to the second network device; and
a first WAN server adapted to:
receive a first message including information related to a modification to the first database from the first network device by way of a WAN, wherein the modification of the first database was effectuated in accordance with one or more functions of a first set of functions;
send a second message including the modification to the first database to the second network device by way of the WAN;
wherein the second network device is adapted to modify the second database based on the modification to synchronize the data in the second database with the data in the first database, wherein the second network device includes a second set of functions for modifying data in the second database, the second set of functions being different than the first set of functions, and wherein the second set of functions includes a particular data analysis function associated with the synchronized data in the first and second databases, wherein the particular data analysis function is not in the first set of functions; and
wherein the first network device comprises a first set of one or more processor-based devices configured to execute:
a first PC-based software module adapted to perform the modification of the first database in accordance with one or more functions of the first set of functions based on an input from a user; and
a first middleware module, separate from the first PC-based software module, adapted to:
detect the modification to the first database by the first PC-based software module;
transmit the first message to the first WAN server by way of the WAN;
determine whether a requested function initiated by a user falls within the first set of functions or within the second set of functions; and
transmit a command to perform the requested function to the second network device by way of the first WAN server in response to determining that the requested function falls within the second set of functions and not within the first set of functions.

23. The system of claim 22, wherein the first WAN server is adapted to re-format the modification information.

24. The system of claim 22, wherein the second network device comprises a second set of one or more processor-based devices configured to operate:

a second PC-based software module adapted to perform a modification of the second database in accordance with one or more functions of the second set of functions based on an input from another user; and
a second middleware module, separate from the second PC-based software module, adapted to modify the second database based on the second message.

25. The system of claim 22, wherein the second network device comprises a second WAN server and the second database comprises a WAN server database.

26. The system of claim 22, wherein the first WAN server is adapted to assign a collision-prevention code to a database object to prevent inconsistent modifications to the object by multiple users.

27. A system, comprising:
a first network device;
a first database coupled to the first network device;
a second network device;
a second database coupled to the second network device;
a first WAN server database; and
a first WAN server adapted to:
receive a first message including information related to a first modification to the first database from the first network device by way of a WAN, wherein the first modification of the first database was effectuated in accordance with one or more functions of a first set of functions;
receive a second message including information related to a second modification to the second database from the second network device by way of the WAN, wherein the second modification of the second database was effectuated in accordance with one or more functions of a second set of functions, the second set of functions being different than the first set of functions, and wherein the second set of functions includes a particular data analysis function associated with synchronized data in the first and second databases, wherein the particular data analysis function is not in the first set of functions; and
modify the first WAN server database based on the first modification information and the second modification information;
wherein the first network device comprises a first set of one or more processor-based devices configured to execute:
a first PC-based software module adapted to perform the first modification of the first database based on an input from a user; and
a first middleware module, separate from the first PC-based software module, adapted to:
detect the first modification to the first database by the first PC-based software module;
transmit the first message to the first WAN server by way of the WAN;
determine whether a requested function initiated by a user falls within the first set of functions or within the second set of functions; and
transmit a command to perform the requested function to the second network device by way of the first WAN server in response to determining that the requested function falls within the second set of functions and not within the first set of functions.

28. The system of claim 27, wherein the first WAN server is adapted to re-format at least one of the first or second modification information.

29. The system of claim 27, wherein the second network device comprises:
a second set of one or more processor-based devices configured to operate:
a second PC-based software module adapted to perform the modification of the second database based on an input from another user; and
a second middleware module, separate from the second PC-based software module, adapted to:
detect the modification to the second database by the second PC-based software module; and
transmit the second message to the first WAN server by way of the WAN.

30. The system of claim 27, wherein the second network device comprises a second WAN server and the second database comprises a second WAN server database.

31. A system comprising:
one or more processor-based devices configured to execute:
a PC-based software module adapted to implement a first change to a PC-based software database based on an input from a user, wherein the PC-based software module includes a first set of functions for modifying data in the PC-based software database; and
a middleware module, separate from the PC-based software module, adapted to:
detect the first change to the PC-based software database;
transmit a first message including information related to the first change to a WAN server by way of a wide area network (WAN);
determine whether a requested function of the input initiated by the user falls within the first set of functions or within a second set of functions, wherein the WAN server includes the second set of functions for modifying data in the WAN server database, the second set of functions being different than the first set of functions; and
transmit a command to perform the requested function to the WAN server in response to determining that the requested function falls within the second set of functions and not within the first set of function; and
the WAN server adapted to:
receive the first message from the middleware module by way of the WAN; and
modify a WAN server database based on the first change to synchronize the data in the WAN server database with the data in the PC-based software database.

32. The system of claim 31, wherein the middleware module is configured to modify that PC-based software database in response to a synchronization command received from the WAN server due to the execution of the requested function.

33. A system comprising:
one or more processor-based devices configured to execute:
a PC-based software module adapted to implement a first change to a PC-based software database based on an input from a user, wherein the PC-based software module includes a first set of functions for modifying data in the PC-based software database; and
a middleware module, separate from the PC-based software module, adapted to:
detect the first change to the PC-based software database;
transmit a first message including information related to the first change to a WAN server by way of a wide area network (WAN);

determine whether a requested function of the input initiated by the user falls within the first set of functions or within a second set of functions, wherein the WAN server includes the second set of functions for modifying data in the WAN server database, the second set of functions being different than the first set of functions; and transmit a command to perform the requested function to the WAN server in response to determining that the requested function falls within the second set of functions and not within the first set of functions; and the WAN server adapted to:
receive the first message from the middleware module by way of the WAN; and
modify a WAN server database based on the first change to synchronize the data in the WAN server database with the data in the PC-based software database, wherein the second set of functions includes a security access function to the synchronized data in the WAN server database and the PC-based software database, wherein the security access function is not in the first set of functions.

34. The system of claim 33, wherein the middleware module is configured to:
detect a request to access the PC-based software database initiated by the user;
transmit, in accordance with the security access function, the access request and credential information associated with the user to the WAN server; and
receive instructions as to whether to allow access to the PC-based software database by the user from the WAN server in accordance with the security access function.

35. A system comprising:
one or more processor-based devices configured to execute:
a PC-based software module adapted to implement a first change to a PC-based software database based on an input from a user, wherein the PC-based software module includes a first set of functions for modifying data in the PC-based software database; and
a middleware module, separate from the PC-based software module, adapted to:
detect the first change to the PC-based software database; and
transmit a first message including information related to the first change to a WAN server by way of a wide area network (WAN);
determine whether a requested function of the input initiated by the user falls within the first set of functions or within a second set of functions, wherein the WAN server includes the second set of functions for modifying data in the WAN server database, the second set of functions being different than the first set of functions; and
transmit a command to perform the requested function to the WAN server in response to determining that the requested function falls within the second set of functions and not within the first set of functions; and the WAN server adapted to:
receive the first message from the middleware module by way of the WAN; and
modify a WAN server database based on the first change to synchronize the data in the WAN server database with the data in the PC-based software database, wherein the second set of functions includes an event log function for the synchronized data in the WAN server database and the PC-based software database, wherein the event log function is not in the first set of functions.

36. The system of claim 35, wherein the middleware module is configured to:
detect an action with respect to a data object in the PC-based software database initiated by the user;
transmit, in accordance with the event log function, information concerning the action to the WAN server; and
wherein the WAN server is configured to create or update an event log associated with the data object in response to receiving the information concerning the action from the middleware module.

37. A system comprising:
one or more processor-based devices configured to execute:
a PC-based software module adapted to implement a first change to a PC-based software database based on an input from a user, wherein the PC-based software module includes a first set of functions for modifying data in the PC-based software database; and
a middleware module, separate from the PC-based software module, adapted to:
detect the first change to the PC-based software database;
transmit a first message including information related to the first change to a WAN server by way of a wide area network (WAN);
determine whether a requested function of the input initiated by the user falls within the first set of functions or within a second set of functions, wherein the WAN server includes the second set of functions for modifying data in the WAN server database, the second set of functions being different than the first set of functions; and
transmit a command to perform the requested function to the WAN server in response to determining that the requested function falls within the second set of functions and not within the first set of functions; and the WAN server adapted to:
receive the first message from the middleware module by way of the WAN; and
modify a WAN server database based on the first change to synchronize the data in the WAN server database with the data in the PC-based software database, wherein the second set of functions includes a revisions log function for the synchronized data in the WAN server database and the PC-based software database, wherein the revisions log function is not in the first set of functions.

38. The system of claim 37, wherein the middleware module is configured to:
detect a revision of data in the PC-based software database initiated by the user;
transmit, in accordance with the revisions log function, information concerning the revision of the data to the WAN server; and
wherein the WAN server is configured to update a revisions log associated with the data in response to receiving the information concerning the revision of the data from the middleware module.

39. A system comprising:
one or more processor-based devices configured to execute:
a PC-based software module adapted to implement a first change to a PC-based software database based on an input from a user, wherein the PC-based software module includes a first set of functions for modifying data in the PC-based software database; and a middleware module, separate from the PC-based software module, adapted to:

detect the first change to the PC-based software database;

transmit a first message including information related to the first change to a WAN server by way of a wide area network (WAN);

determine whether a requested function of the input initiated by the user falls within the first set of functions or within a second set of functions, wherein the WAN server includes the second set of functions for modifying data in the WAN server database, the second set of functions being different than the first set of functions; and transmit a command to perform the requested function to the WAN server in response to determining that the requested function falls within the second set of functions and not within the first set of functions; and the WAN server adapted to:

receive the first message from the middleware module by way of the WAN; and modify a WAN server database based on the first change to synchronize the data in the WAN server database with the data in the PC-based software database, wherein the second set of functions includes an action approval function for the synchronized data in the WAN server database and the PC-based software database, wherein the action approval function is not in the first set of functions.

40. The system of claim 39, wherein the middleware module is configured to:

detect a request to perform an action with respect to a data object in the PC-based software database initiated by the user;

transmit, in accordance with the action approval function, information concerning the request to the WAN server; and wherein the WAN server is configured to:

determine, in response to receiving the action request, whether to send an approval request to a second user based on an approval criteria associated with the data object;

transmit the approval request to the second user in response to the approval criteria indicating approval for the action by the second user; and transmit information concerning an approval or disapproval for the requested action based on a response received from the second user or lack of the response within a defined time period from the transmitting of the approval request.

41. A system comprising:

one or more processor-based devices configured to execute:

a PC-based software module adapted to implement a first change to a PC-based software database based on an input from a user, wherein the PC-based software module includes a first set of functions for modifying data in the PC-based software database;

a middleware module, separate from the PC-based software module, adapted to:

detect the first change to the PC-based software database; and transmit a first message including information related to the first change to a WAN server by way of a wide area network (WAN);

determine whether a requested function of the input initiated by the user falls within the first set of functions or within a second set of functions, wherein the WAN server includes the second set of functions for modifying data in the WAN server database, the second set of functions being different than the first set of functions; and transmit a command to perform the requested function to the WAN server in response to determining that the requested function falls within the second set of functions and not within the first set of functions; and the WAN server adapted to:

receive the first message from the middleware module by way of the WAN; and modify a WAN server database based on the first change to synchronize the data in the WAN server database with the data in the PC-based software database, wherein the second set of functions includes an alert function associated with the synchronized data in the WAN server database and the PC-based software database, wherein the alert function is not in the first set of functions.

42. The system of claim 41, wherein the middleware module is configured to:

detect a change to the data in the PC-based software database initiated by the user;

transmit information concerning the change to the WAN server; and wherein the WAN server is configured to determine whether to transmit a message, in accordance with the alert function, based on a message criteria and the change to the data.

* * * * *